June 7, 1960 E. F. LINHORST 2,939,173
AUTOMATIC MOLDING MACHINE
Filed July 24, 1958 7 Sheets-Sheet 5
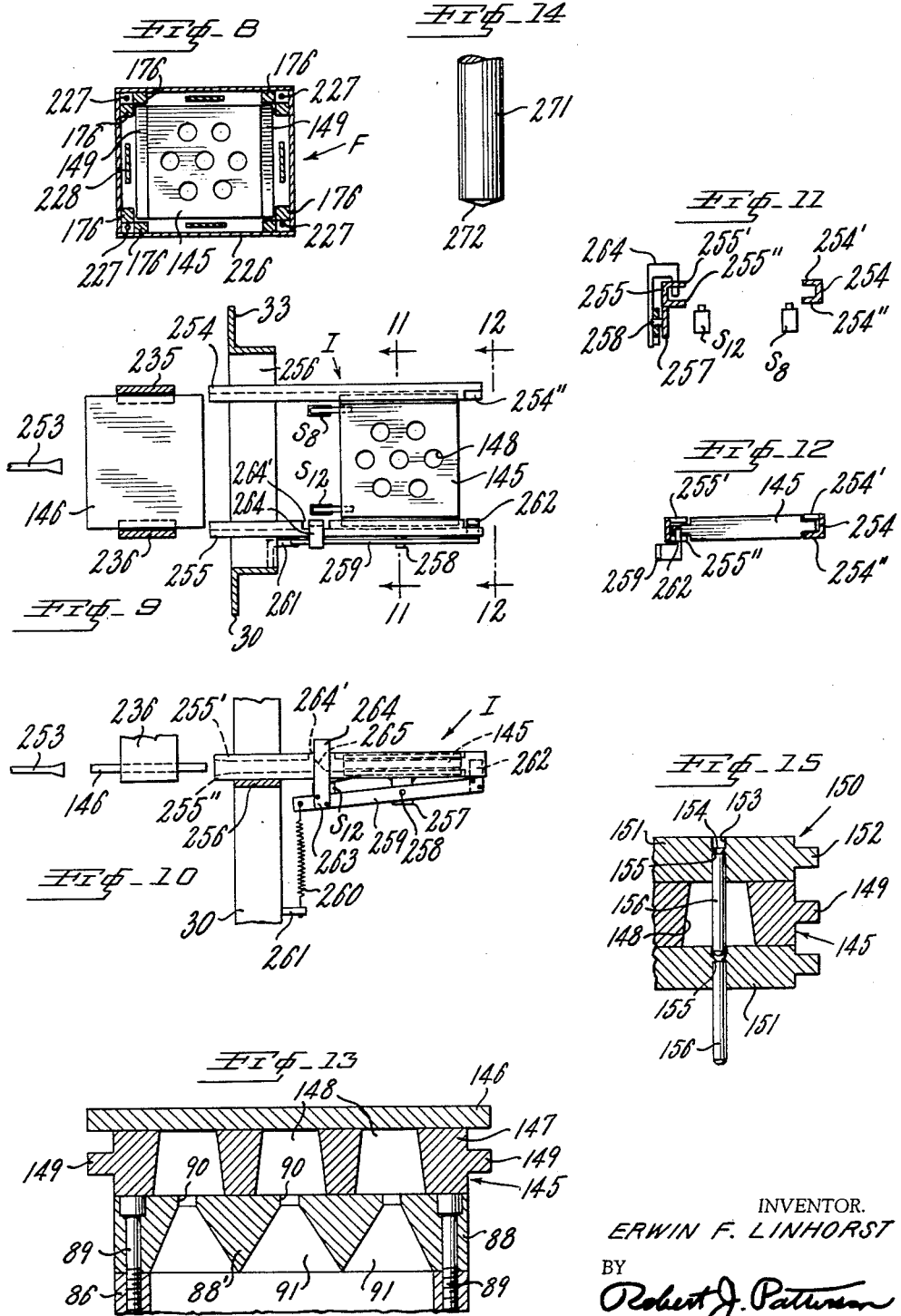
INVENTOR.
ERWIN F. LINHORST
BY
Robert J. Patterson
ATTORNEY

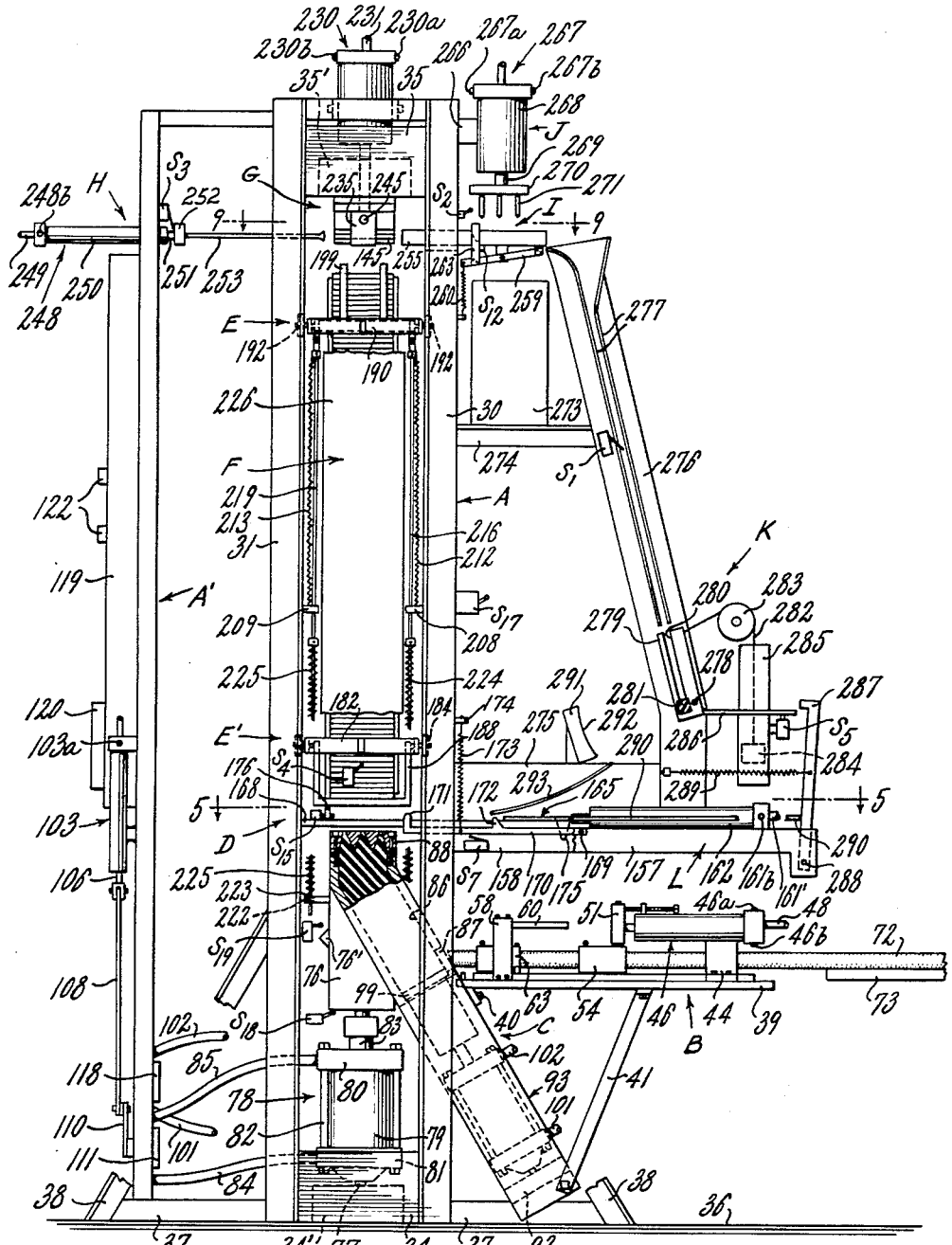

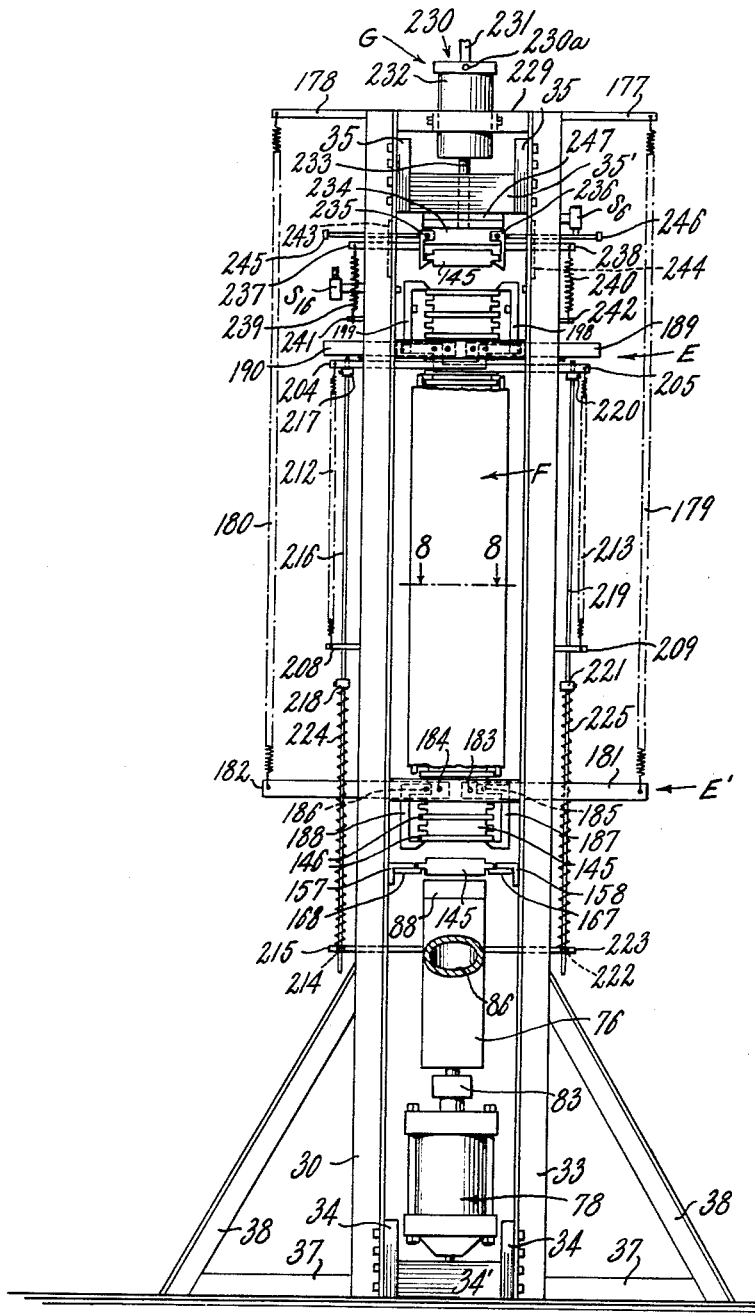

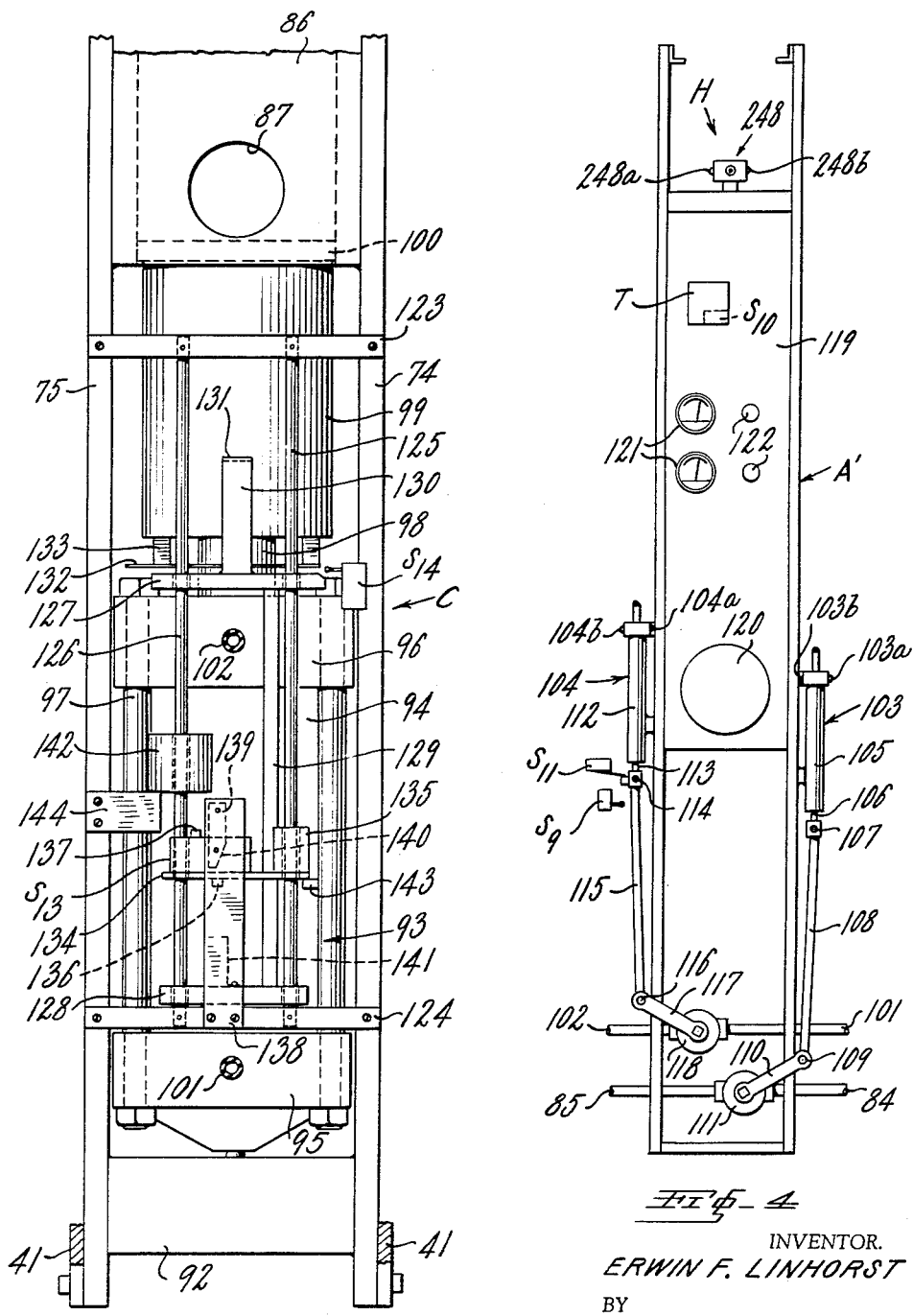

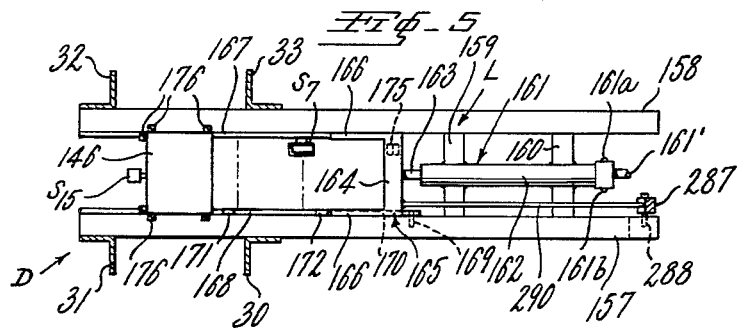
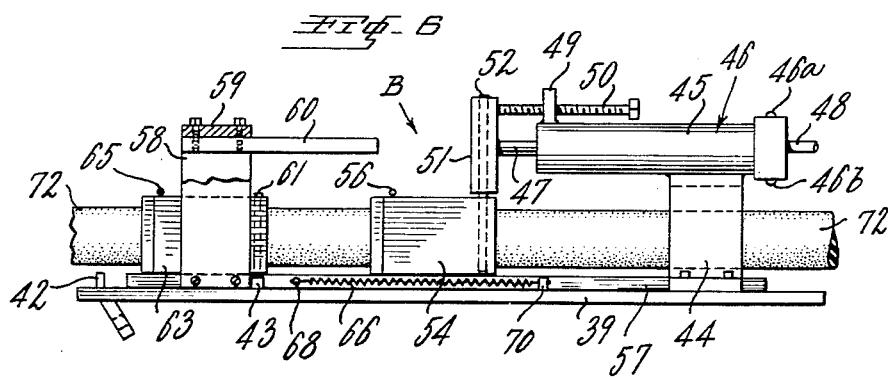
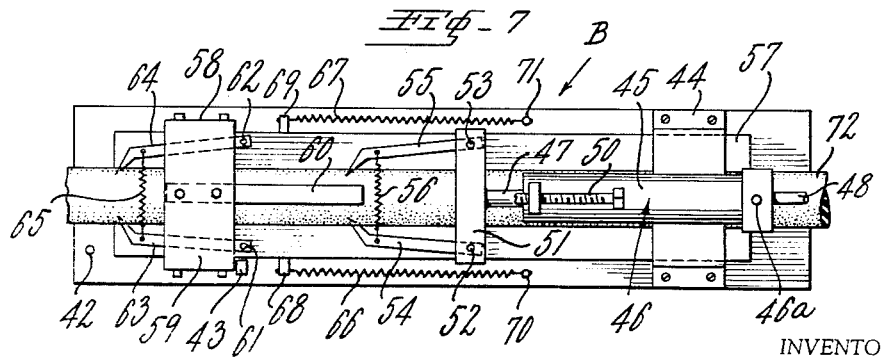

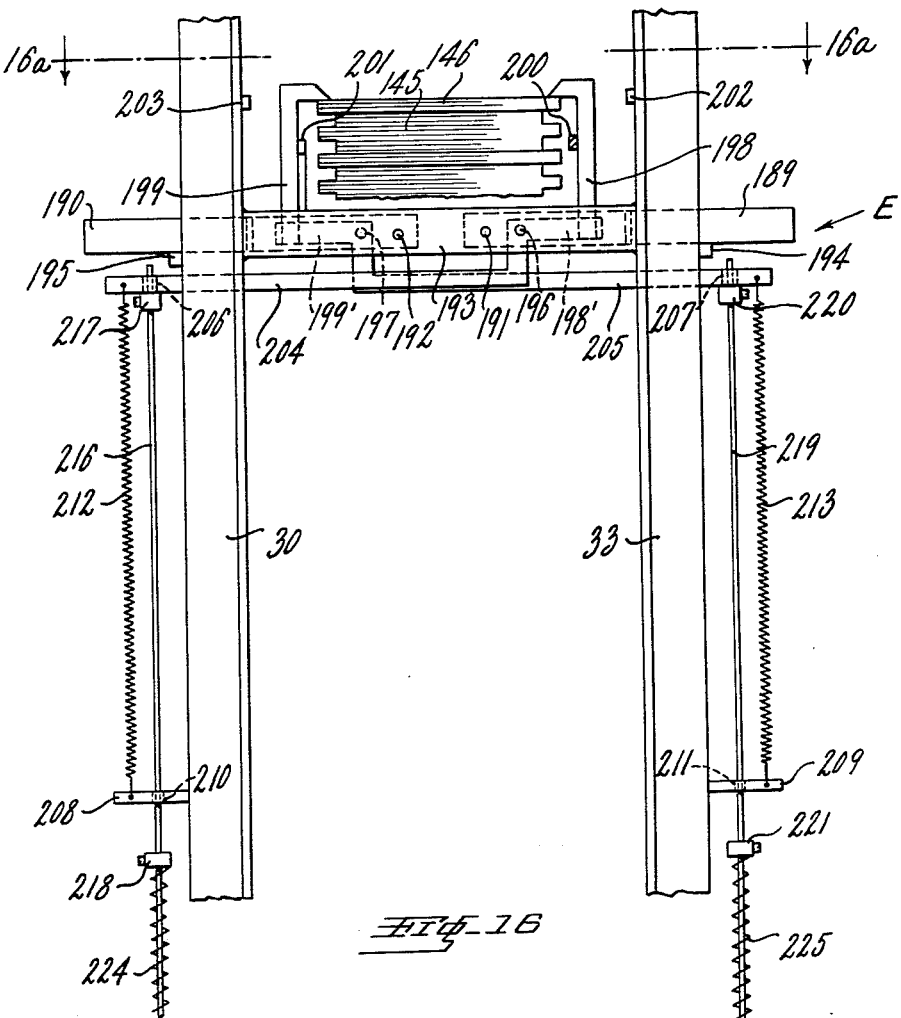
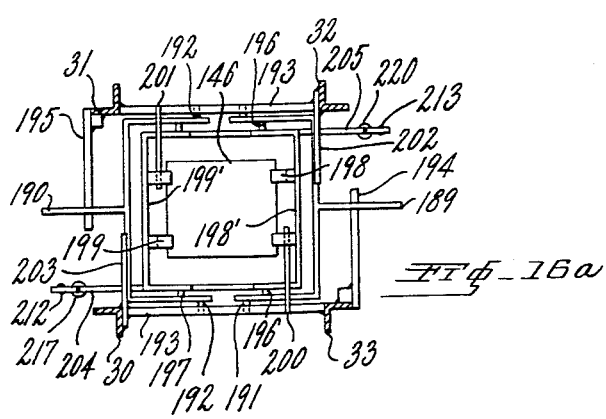

June 7, 1960    E. F. LINHORST    2,939,173
AUTOMATIC MOLDING MACHINE
Filed July 24, 1958    7 Sheets-Sheet 7
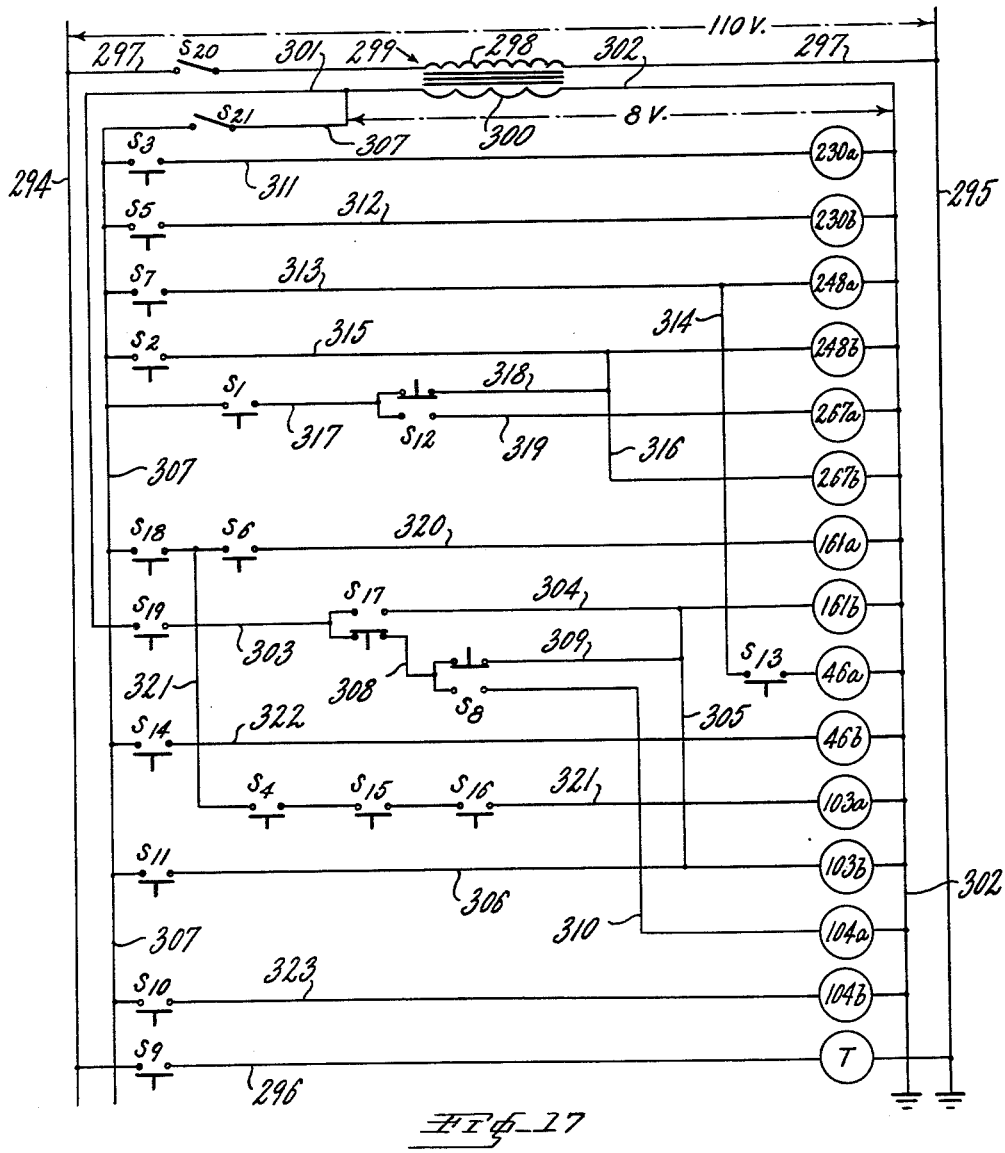
Fig. 18    Fig. 19
INVENTOR.
ERWIN F. LINHORST
BY Robert J. Patterson
ATTORNEY United States Patent Office 2,939,173
Patented June 7, 1960

2,939,173
AUTOMATIC MOLDING MACHINE

Erwin F. Linhorst, Paterson, N.J., assignor to United States Rubber Company, New York, N.Y., a corporation of New Jersey Filed July 24, 1958, Ser. No. 750,742

17 Claims. (Cl. 18—4)

This invention relates to means for producing molded articles of rubber or like thermosetting molding material, and in particular to a machine for automatically molding and collecting rubber stoppers.

In my copending application Serial No. 542,659, filed October 25, 1955, now U.S. Patent No. 2,873,475, there is disclosed a machine for automatically and continuously molding rubber articles which includes a variety of means for automatically and in sequence positioning a plurality of molds at a landing, filling the molds with rubber or like molding material, advancing the filled molds in the form of a column or stack through a heating and curing chamber, removing the molds with the cured articles therein from the chamber and column, ejecting the cured articles from the so removed molds, and returning the empty molds to their starting positions prior to refilling thereof with uncured molding material for a subsequent molding operation. The present invention constitutes an improvement of the machine disclosed in my aforesaid copending application.

It is an object of the present invention to provide a fully automatic machine for molding rubber or like articles of various types, shapes and dimensions.

It is another object of the present invention to provide a machine of the character referred to in which an electrically controlled pneumatic system and a similarly controlled hydraulic system initiate and control the various sequential steps of each molding operation.

It is also an object of the present invention to provide a machine of this type with an injection unit and with means for ensuring that there is always retained in the injection unit a sufficient predetermined minimum amount of rubber stock to be molded.

It is a concurrent object of the present invention to provide means which will prevent feeding of additional rubber stock into the injection unit as long as the quantity of stock therein exceeds the aforesaid predetermined minimum amount.

Still another object of the present invention is the provision of means which, after feeding a quantity of rubber stock into the injection unit and severance of this quantity from the supply, retract the supply from the entrance to the feeding unit to prevent soiling of the latter by excess stock.

A further object of the present invention is to provide means in an automatically operating machine of the aforesaid type which retain a stack of molds in compacted relationship during the curing of the rubber articles and which are periodically released from the top of the stack to permit removal therefrom of the uppermost mold.

Still a further object of the present invention is the provision of means for ejecting the molded articles from their respective molds, which means include ejector pins suitably shaped to prevent adhesion of the molded articles to the pins.

It is yet a further object of the present invention to provide a plurality of safety features which act to prevent performance of any one or more of the various steps of each molding operation until predetermined prerequisite conditions are met and/or previous steps completed.

The foregoing and other objects, characteristics and advantages of the present invention will be more fully understood from the following detailed description which is to be read in conjunction with the accompanying drawings, in which:

Fig. 1 is a side elevational view of a machine constructed in accordance with the principles of the present invention, certain parts being broken away or shown in section for the sake of clarity;

Fig. 2 is a rear elevational view of the machine, certain parts being omitted;

Fig. 3 is an elevational view of the injection unit employed in the machine;

Fig. 4 is a front elevational view of the machine showing some of the control features thereof;

Fig. 5 is a plan view taken substantially along the line 5—5 in Fig. 1 and showing the mold plate positioning mechanism;

Fig. 6 is an elevational view of the stock feeding mechanism for the injection unit;

Fig. 7 is a top plan view of the stock feeding mechanism shown in Fig. 6;

Fig. 8 is a sectional view taken along the line 8—8 in Fig. 2 and showing details of the heating and curing column;

Fig. 9 is a plan view taken substantially along the line 9—9 in Fig. 1 and showing the catch-release mechanism for mold plates removed from the heating and curing column;

Fig. 10 is a side elevational view of the structure shown in Fig. 9;

Fig. 11 is a sectional view taken along the line 11—11 in Fig. 9;

Fig. 12 is an end elevational view taken along the line 12—12 in Fig. 9;

Fig. 13 is a sectional view of the upper end of the injection unit, showing details of a sprue plate and a mold positioned thereon;

Fig. 14 is a fragmentary elevational view of an ejector pin employed in conjunction with the present invention;

Fig. 15 is a fragmentary sectional view of a modified type of mold employed in the present invention;

Fig. 16 is a fragmentary elevational view of the hold-down mechanism for the mold stack and illustrates the means for releasing this mechanism from the stack;

Fig. 16a is a partly sectional plan view taken along the line 16a—16a in Fig. 16;

Fig. 17 is a wiring diagram of the electric control circuit for the machine of the present invention;

Fig. 18 shows an article molded in a mold as shown in Fig. 13; and

Fig. 19 shows an article molded with the use of a mold as shown in Fig. 15.

Referring first to Fig. 1, it will be seen that the molding machine in general comprises a main frame A to the front of which is attached an auxiliary frame A', a stock feed mechanism B, a reciprocal stock injection unit C, a landing arrangement D for supporting mold plates prior to their assembly into stack formation, upper and lower mold stack supports E and E', a heating or curing column and stack guide unit F, a mold removing and disassembly mechanism G, a mold shifting and repositioning mechanism H, a mold release-catch lever mechanism I, an ejector mechanism J, a mold plate return device K, and a mold plate feeding mechanism L. The operation of the entire machine in a proper sequence is controlled by an electric circuit including a plurality of switches $S_1$ to $S_{21}$ (see Fig. 17) which serve to actuate a number of hydraulic and pneumatic motors included in the various mechanisms, the pneumatic motors being actuatable by solenoid valves having respective energization terminals hereinafter generally referred to as the reversing actuating terminals of these motors. In its overall aspects, therefore, this organization is similar to that disclosed in my above-mentioned copending patent application Serial No. 542,659, but as far as necessary, even those parts of my machine which are old will herein be described in sufficient detail to facilitate an understanding thereof as well as of the novel features constituting the present invention.

*The frame*

The main frame A generally comprises four vertical angle irons 30, 31, 32 and 33 rigidly connected together at their bottom and top ends by channel iron structures 34—34' and 35—35', respectively, bolted to the angle irons. The frame itself is mounted on a floor or other rigid supporting surface 36 and is stabilized by four pairs of base thrust members 37 extending to the four sides of the machine and by angularly upwardly extending pairs of struts 38 rigidly connected, as by welding or riveting, at their bottom ends to the base members 37 and at their top ends to the angle irons 30 to 33. The frame A supports the various devices and mechanisms enumerated hereinbefore in a manner to be more fully described presently.

*The stock feed mechanism*

As best seen in Figs. 1, 6 and 7, the stock feed mechanism comprises a base platform 39 which is connected to and carried by the injection unit C for movement therewith. To this end, the front end of the platform 39 is welded or bolted to the outer casing of the injection unit at 40 and bolted to and supported intermediate its ends by a pair of struts 41 connected at their lower ends to the lowermost end of the injection unit (see also Fig. 3). Fixedly positioned on the platform 39 adjacent its front end are stops 42 and 43. Bolted to the platform 39 at its rear end is a substantially U-shaped frame 44 the upper part of which carries a cylinder 45 of a conventional double-acting pneumatic motor 46 provided with a piston (not shown) reciprocally arranged within the cylinder 45 and provided with a piston rod 47 extending slidably through the front end of the cylinder, the pneumatic motor 46 being provided with reversing actuating terminals 46a and 46b and an air inlet tube 48.

The cylinder 45 at its front end has rigidly affixed thereto an internally threaded bracket 49 through which extends a threaded bolt or abutment screw 50. The front end of the piston rod 47 carries a bracket or head 51 through the opposite sides of which extend a pair of vertical pivot pins 52 and 53 on the lower halves of which are mounted movable jaw members 54 and 55, respectively, these jaw members being biased toward one another by a tension spring 56.

Slidably mounted on the base platform 39 is a plate 57 the rear end of which extends between and is guided by the legs of the U-shaped bracket 44. Adjacent its front end, the plate 57, one side of which slidingly engages the stop 43, carries a rigid U-shaped bracket 58 to the horizontal cross member 59 of which is bolted a rearwardly extending abutment bar 60. As best shown in Figs. 6 and 7, the bracket 58 is so attached to the plate 57 as to be located intermediate the stops 42 and 43, the stop 42 being so positioned on the platform 39 as to be engageable with the front edge of the plate 57. Positioned immediately behind the bracket 58 and also carried by the plate 57 are two vertical pivot pins 61 and 62 carrying respective jaw members 63 and 64 biased toward one another by a tension spring 65. A pair of springs 66 and 67 connected at their front ends to projections 68 and 69 affixed to the slidable plate 57 and at their rear ends to bolts 70 and 71 affixed to the platform 39 bias the plate 57 rearwardly of the platform 39, the extent of rearward movement being limited by engagement of the rear edge of the bracket 58 with the stop 43. The stock 72 to be molded, which may be rubber (natural or synthetic) or any suitable preferably thermosetting plastic material whatsoever, is initially supported in the form of a coiled solid tube on a rotatable table 73 (see Fig. 1), the front portion of the stock extending over the slidable plate 57 and through the bracket 44, under the bracket or piston rod head 51, between the jaws 54 and 55, through the bracket 58 and between the jaws 63 and 64 to the injection unit C.

From the foregoing it will be understood that the extent of retraction of the piston rod 47 and thus of the jaws 54 and 55 is limited by the front end of the adjustable abutment screw 50 which extends forwardly of the cylinder 45, while the extent of forward movement of the piston rod 47 relative to the plate 57 is limited by the abutment bar 60 affixed to the bracket 59. Thus, if the motor 46 is actuated through energization of its terminal 46a to advance the piston rod 47, the jaws 54 and 55 will grippingly engage the stock 72 and forcibly displace the same toward the injection unit, the jaws 63 and 64 being at this time resiliently urged apart by the stock 72 sliding therebetween while the plate 57 remains at rest. When the bracket 51 engages the bar 60, the latter and therewith the bracket 58 and slidable plate 57 will be displaced forwardly along the base plate 39 a distance of about ¼ of an inch until the front end of the plate 57 contacts the stop 42. Upon retraction of the piston rod 47 due to energization of the terminal 46b of the pneumatic motor 46, the plate 57 and the stock 72 thereon will be retracted rearwardly from the inlet of the injection unit due to the action of the springs 66 and 67 until the bracket 58 again contacts the stop 43. The purpose of this slight rearward movement of the stock will become more fully clear as the description proceeds.

*The injection unit*

The injection unit C, best shown in Figs. 1 and 3, is arranged adjacent the lower part of the frame A and extends at a slant through the space between the rear frame angle irons 30 and 33, thus reducing the overall vertical dimensions of my present machine and permitting it to be accommodated in rooms of smaller vertical dimensions than the machine disclosed in my above-mentioned copending application. The injection unit according to the present invention comprises a pair of mounting plates 74 and 75 rigidly affixed to a block 76 disposed within the confines of the angle irons 30 to 33. Universally supported at 77 on the center piece 34' of the channel iron structure located at the base of the frame A is a hydraulic lift motor 78 including a cylinder 79, the upper and lower crossheads 80 and 81 of which are interconnected by tie rods 82, and a piston (not shown) provided with a piston rod 83 extending upwardly through the crosshead 80 and supporting the base of the mounting block 76, the hydraulic motor 78 thus being adapted to reciprocate the entire injection unit C relative to the frame A in response to admission of hydraulic fluid into the cylinder 79 via conduits 84 and 85. Switch $S_{18}$ is mounted on the frame A for actuation by the base of the block 76, and a projection 76' of the latter is adapted to actuate switch $S_{19}$, as more fully explained hereinafter.

Welded to the mounting plates 74 and 75 is an injection cylinder 86 provided at one side thereof adjacent its lowermost end with a stock inlet opening 87. The injection cylinder 86 is open at its upper and lower ends, the open upper end of this cylinder being covered by a sprue plate 88 (see also Fig. 13) removably attached to the cylinder by bolts or screws 89 the heads of which, due to the provision of counterbored recesses in the sprue plate 88, terminate flush with the uppermost surface of the latter. The sprue plate 88 is provided in its upper surface with a plurality (seven in the disclosed embodiment) of apertures or orifices 90 communicating with respective tapered passageways 91, the inner portions 88' of the sprue plate which define the passageways 91 being provided with sharp bottom edges so as to prevent any accumulation of stock thereat, a defect which could readily arise if these edges were flat. Rigidly welded or bolted to the mounting plates 74 and 75 adjacent the lowermost ends thereof is a bearing plate 92 on which is universally mounted a hydraulic injection motor 93 including a cylinder 94, the crossheads 95 and 96 of which are rigidly interconnected by tie rods 97, and a piston (not shown) reciprocally arranged within the cylinder 94 and provided with a piston rod 98 extending upwardly through the crosshead 96 and carrying an injection plunger 99 provided with a slightly enlarged head 100 extending into the open lower end of the injection cylinder 86. As will readily be understood, the piston rod 98 and thus the injection plunger 99 will be reciprocally displaced between the plates 74 and 75 in accordance with the admission of hydraulic fluid to the cylinder 94 via conduits 101 and 102.

As best shown in Figs. 1 and 4, independent control means for the hydraulic lift motor 78 and the hydraulic injection motor 93 are provided for the purpose of reciprocating the injection unit C and the injection plunger 99 thereof, respectively. Rigidly mounted on opposite sides of the front of the auxiliary frame A' attached to the frame A are two double-acting pneumatic motors 103 and 104 provided with reversing actuating terminals 103a—103b and 104a—104b, respectively. A piston (not shown) reciprocal within the cylinder 105 of the motor 103 is provided with a piston rod 106 articulated at 107 to a link 108 which is in turn articulated at 109 to an operating lever 110 of a suitable 4-way valve 111 communicating with and controlling the flow of hydraulic fluid through the conduits 84 and 85 in substantially the same manner as disclosed in my aforesaid copending application. Similarly, a piston (not shown) reciprocal within the cylinder 112 of the motor 104 is provided with a piston rod 113 articulated at 114 to a link 115 articulated in turn at 116 to an operating lever 117 of a 4-way valve 118 communicating with and controlling the flow of hydraulic fluid through the conduits 101 and 102. Switches $S_9$ and $S_{11}$ are mounted to be closed, respectively, upon protraction and retraction of the piston rod 113. Also mounted on the auxiliary frame A' is a control panel 119 on which are arranged a timer T, the switch $S_{10}$, a power transformer 120, meters 121, and control knobs 122.

From the foregoing it will be appreciated that the stock 72 is fed by the pneumatic motor 46 into the injection cylinder 86 through the opening 87 thereof and that the hydraulic lift motor 78 may then be actuated to position the upper surface of the sprue plate 88 directly beneath the landing arrangement D whereupon, assuming certain other conditions to have been met, the injection motor 93 can be actuated to force the stock 72 by means of the plunger 99—100 through the injection cylinder and the orifices 90 of the sprue plate. In accordance with the present invention, as stated hereinabove, the termination of the stock feeding operation upon reversal of the motor 46 is accompanied by a slight retraction of the stock 72 from the opening 87 of the injection cylinder, this, of course, occurring only after the plunger 99 has been advanced and the head 100 thereof has severed the supply of stock, i.e., that portion of the coiled tube located just outside the opening 87, from that portion thereof disposed within the injection cylinder. The stock retraction by the springs 66 and 67 and their associated elements thus prevents a subsequent soiling and clogging of the injection unit which could result from excess stock being caught by the plunger head 100 during its retraction past the opening 87.

The present invention further contemplates the provision of means to ensure that a sufficient quantity of the stock 72 is always retained within the injection cylinder 86, and that, if more than a predetermined quantity of such stock is in the cylinder, no additional stock is fed into the latter until such quantity of stock as remains in the cylinder is less than the aforesaid predetermined quantity. Such means, which may best be designated a feed control mechanism, will now be described.

Having reference particularly to Fig. 3, a pair of bars 123 and 124 are bolted across the space between the mounting plates 74 and 75 at respective locations spaced from one another longitudinally of the injection unit. Extending between the transverse bars 123 and 124 and suitably fastened thereto are guide rods 125 and 126. Two crossbars 127 and 128 are provided with suitable apertures through which the rods 125 and 126 extend freely to permit slidable displacement of the crossbars along the rods, the bars 127 and 128 being interconnected by straps 129 (only one of which is shown). Attached to the upper side of the crossbar 127 is an upright narrow plate or strip 130 provided with a transverse projection 131, and a metal plate 132 is affixed to the base of the plunger 99 by means of spacer blocks 133, the plate 132 projecting sufficiently far to one side of the plunger as to be engageable with the projection 131 on the strip 130. The switch $S_{14}$ is mounted on the plate 74 so as to be actuated by the crossbar 127.

Also slidably mounted on the rods 125 and 126 is a small platform 134 provided with an elongated bushing 135 encompassing the rod 125. The bushing serves to prevent tilting of the platform 134, and twisting of the latter is inhibited by the rods themselves, whereby the possibility of binding between the platform and the rods is completely eliminated. At its opposite side, the platform 134 carries switch $S_{13}$, hereinafter referred to as a limit or reset switch, which is provided with two actuating plungers 136 and 137. Bolted to the transverse bar 124 at one side thereof is an upright member 138 to the upper end of which is attached a small plate 139 provided with a slanted surface 140. The lower crossbar 128 which is movable with the crossbar 127 carries a thin metal reed 141. Slidably retained on the vertical rod 126 above the platform 134 is a weight 142. A stop 143 determines the extent to which the platform 134 can slide downwardly along the rods 125 and 126, and a stop 144 spaced a predetermined vertical distance from the stop 143 determines the extent to which the weight 142 can descend along the rod 126.

In operation, assuming that the motor 46 has been actuated by energization of its terminal 46a, with switches $S_7$ and $S_{13}$ closed, to feed stock into the injection cylinder 86, the plunger 99 is now advanced by the hydraulic motor 93 to cut the stock within the cylinder off from its source at the opening 87 through the intermediary of the head 100. The advance of the plunger continues without any displacement of the other parts described hereinabove until the plate 132 engages the projection 131 of the strip 130 attached to the upper crossbar 127, which will occur shortly after the head 100 has passed the opening 87. Further advancing movement of the plunger 99 now entrains the crossbars 127 and 128 into upward movement along the guide rods 125 and 126, and the crossbar 127 thus actuates the switch $S_{14}$ which (see Fig. 17) energizes the terminal 46b of the motor 46 to retract the piston rod 47 thereof and therewith the stock 72 from the opening 87 in the injection cylinder 86. At the same time, the reed 141 moves upwardly with the crossbar 128 until it contacts the plunger 136 of the reset switch $S_{13}$ so as to open the latter. Immediately thereafter, the reed 141 begins to raise the platform 134 off its stop 143, the reset switch, of course, riding upwardly with the platform 134. After a slight further rising movement, the reed 141 comes into contact with the slanted surface 140 of the small plate 139 attached to the upright member 138 and is deflected from the plunger 136 of the reset switch while remaining in engagement with the base of the platform 134. Thus, the reset switch $S_{13}$ will continue to rise as long as the plunger is being advanced, and such advancing movement of the plunger will continue for the remainder of an interval controlled by the timer T which has been preset in accordance with the amount of time normally required to fill a mold still to be described. If, at this time, the quantity of molding stock in the injection cylinder 86 is not only sufficient for the injection operation then being carried out but is also in excess of a predetermined minimum quantity (say enough for a subsequent injection operation), then upward movement of the plunger and thus of the platform 134 will terminate before the plunger 137 of the switch $S_{13}$ reaches the weight 142, and it will then be impossible for the feed motor 46 to be further actuated due to the fact that the reset switch is still open. If, however, the quantity of stock in the injection cylinder 86 falls below the aforesaid minimum, then the plunger 99 and platform 134 will rise sufficiently to cause the weight 142 to be engaged by the plunger 137 of the reset switch $S_{13}$ so as to close the latter, whereby closing of the switch $S_7$ by means still to be described will permit actuation of the pneumatic feed motor 46 so as to again advance the stock 72 through the opening 87 of the injection cylinder.

*The molds*

Prior to proceeding with a description of the landing arrangement D and the associated elements of the machine, it appears advisable to describe the construction of the molds to be employed in conjunction with the machine, as well as the articles to be produced thereby. Referring, therefore, most particularly to Figs. 8, 9 and 13, it will be seen that each mold consists of cavity plate 145 and a cover plate 146. Each cavity plate 145 has a relatively thick central body 147 in which are formed a plurality of mold cavities 148 (seven in the disclosed embodiment), and each cavity plate is furthermore provided on two of its opposite sides with a pair of runners or ledges 149, the purpose of which will become clear presently. Each cover plate 146 is imperforate and of uniform thickness throughout, the thickness of each cover plate 146 being substantially the same as that of each runner 149 of the cavity plates 145. The mold cavities 148 taper slightly from their lower ends to their upper ends, as a result of which the articles molded from the stock injected into these cavities will have a somewhat frusto-conical shape, as shown in Fig. 18. In this particular instance, the articles to be molded comprise imperforate stoppers for use in chemical apparatus such as bottles, flasks, test tubes and the like, but it will be realized that other types of articles may be made in the molds merely by varying the shapes of the cavities 148.

The width of the thick central portion 147 of each cavity plate 145 is exactly the same as that of the sprue plate 88, and the cavities 148 are so distributed throughout each cavity plate that they will be substantially axially aligned with the injection apertures or orifices 90 of the sprue plate when the respective cavity plate is located on the latter. Of course, the number of cavities in the cavity plate may be more or less than seven, it being only necessary that the sprue plate have as many orifices 90 as there are cavities 148 in the mold plates 145 employed. For the sake of clarity, neither the lower mold plate stack support E' nor the stack of mold plates above the cover plate 146 is shown in Fig. 13.

In the event that it is desired to manufacture stoppers having a central passageway therethrough, as shown in Fig. 19, it is necessary to slightly modify the molds to be employed, as best shown in Fig. 15. According to this embodiment of the invention, the cavity plates 145 remain unaltered, but each cover plate 150 now consists of a thickened central portion 151, a pair of runners 152 arranged at two of its opposite sides, and a plurality of recesses 153 extending entirely through the central portion 151. Each recess 153 has an upper and a lower portion with the former having a very slightly greater diameter, and the upper portion of each recess is narrowed as shown at 154 to provide an upper annular shoulder 155 for the lower portion of the recess 153, against which shoulder the upper end of a rigid pin 156 press fitted into the said lower recess portion is adapted to abut. The recesses 153 are so distributed throughout each cover plate 150 that each pin 156 extends axially through a respective one of the cavities 148 when the respective cover plate is located on a cavity plate. Moreover, the pins 156 are made somewhat longer than the axial height of the cavities 148, thereby to enable the lower or free end of each pin to extend through and beyond the respective mold cavity 148 both during an injection operation and when forming part of the stack in the heating unit F. In the former case (which is not illustrated in the drawings), the pins 156 extend into the injection orifices 90 with sufficient clearance to permit the injection to be carried out. When the cover plates 150 form parts of the molds in the stack, the pins extend with a snug fit into the upper portions of the recesses 153 of the next lower cover plate 150 (see Fig. 15) which ensures that none of the stock injected into the cavities 148 can expand into the recesses 153 located therebelow during the heating and curing operation. In any event, of course, i.e., whether or not cover plates 146 or 150 are used, the diameter of each injection orifice 90 is sufficiently small as to ensure a clean break between the stock injected into the cavity plate and the remaining stock still in the injection cylinder, substantially in the plane of the lower cavity plate surface. As will be understood, if double-holed stoppers are to be made, it will be necessary to provide two pins 156, and also two recesses 153, for each cavity 148. The continuity between the associated upper and lower portions of each recess 153 facilitates disassembly of the cover plates, since each pin 156 can be simply impacted from its rear end through the upper portion of the respective recess to drive it out of the lower portion of the latter.

*The mold plate landing and feeding arrangements*

In proceeding to a description of the landing arrangement for supporting the various mold plates above the sprue plate of the injection unit, it must be kept in mind that the cavity and cover plates are always arranged in alternating sequence and will ultimately be so positioned in a compact stack or column (see Fig. 2) during the curing operation. Thus it is also necessary that the mold plates be fed by the feeding mechanism L one at a time and in alternating sequence to the landing arrangement D.

Referring now to Figs. 1 and 5 in particular, it will be seen that spaced, rigid support members 157 and 158 are fixedly attached to and extend rearwardly from the angle irons 30—31 and 32—33, respectively, of the frame A (those portions of these support members extending through the frame being omitted in Fig. 1 for the sake of clarity). Two transverse members 159 and 160 are welded or otherwise rigidly affixed to the support members 157 and 158, and on these transverse members is rigidly mounted a double-acting pneumatic motor 161 provided with reversing actuating terminals 161a and 161b and an air inlet tube 161' and including a cylinder 162 and a piston (not shown) reciprocal therein and terminating in a piston rod 163 extending slidably through the front end of the cylinder. Attached to the front end of the piston rod 163 is the cross member 164 of a fork-shaped pusher device 165, the parallel legs 166 of which extend forwardly from the cross member 164 and ride on a pair of rails 167 and 168 arranged, respectively, at the inner edges of the support members 157 and 158 (see also Fig. 2) and designed to provide a running track for the mold plates 145 and 146 (or 150) arriving from the ejector mechanism J via the return device K, both still to be described. Pivotally mounted at 169 on the support member 157 somewhat to the rear of the most retracted position of the cross member 164 and immediately beneath the plane of the rail 168 is a catch arm 170 provided with two longitudinally spaced projections or noses 171 and 172 and biased upwardly against the rail 168 by a spring 173 anchored to a projection 174 affixed to the angle iron 30 of the frame A. The rail 168 is, of course, provided with two recesses to permit the noses 171 and 172 to project therethrough. The switch $S_7$ referred to hereinabove is mounted on the inside of the support member 158 in position to be actuated by a small projection 175 provided on the lower surface of the cross member 164 of the fork-shaped pusher device 165.

Thus, when the pusher device 165 is advanced upon energization of the terminal 161a of the motor 161, the front edge of that one of the legs 166 riding on the rail 168 first contacts the nose 172 and depresses the latter, and thereby the entire arm 170, against the force of the spring 173. This lowers the nose 171 out of the rail 168, and the legs of the pusher device 165 can now shift a mold plate, previously stationary on the running track and abutting against the nose 171, forwardly onto the landing D. Upon retraction of the piston rod 163 and the pusher device 165, the arm 170 resumes its normal position.

The ultimate terminal position for mold plates moved along the track 167—168 is defined by the lower ends of six vertical guide rods 176 disposed individually adjacent the opposite corners of three sides of a rectangular central area of the frame A, as best shown in Fig. 5, switch $S_{15}$ being positioned to be contacted and closed by a mold plate when the same reaches this terminal position. Reference to Fig. 17 will show that if this condition does not obtain, i.e., if a mold plate stops on the track 167—168 before fully reaching the said terminal position, it will be impossible to operate the pneumatic motor 103 for the purpose of actuating the valve 111 in such a manner as to permit the hydraulic motor 78 to lift the injection unit C, and the entire machine will thus remain inoperative until the mold plate involved assumes its terminal position as defined by the guide rods 176.

*The mold stack supports*

From the foregoing description it will be understood that the cavity plates are filled with molding stock 72 while disposed on the landing D, and that they thereafter are raised into the heating and curing unit F, each cavity plate having a cover plate disposed both above and below it, the cover plates arriving at the landing D in alternating sequence with the cavity plates and being raised into the heating column in the same alternating sequence. In this manner, a stack of molds, i.e., mold plates 145 and 146, is formed in the heating unit F, and means must be provided which support the stack of mold plates in the unit F in a compact condition. This function is performed by the upper and lower mold stack supports E and E' which will now be described with reference to Figs. 1, 2, 16 and 16a in particular.

The lower mold plate support E' includes a pair of lateral brackets 177 and 178 rigidly affixed to the frame A at the upper ends of the angle irons 30 to 33, the brackets 177 and 178 having anchored thereto tension springs 179 and 180, respectively the lower ends of which are connected with the outer ends of two substantially fork-shaped toggle levers 181 and 182 (these levers being shaped substantially like those identified by the reference numerals 129 and 130 in my above-mentioned copending application). The facing ends of the toggle levers 181 and 182, i.e., the forked ends thereof, are pivoted to the frame A at 183 and 184, respectively. Pivotally connected to the forked portions of the toggle levers 181 and 182 at 185 and 186, respectively, and disposed within the confines of the said forked portions are pawls 187 and 188 the hooked lower ends of which are adapted to underlie the lowest mold plate (146 in Fig. 2) picked up from the landing D. Switch $S_4$ is arranged to be closed by the "handle" portion of the toggle lever 181 when the latter is rocked downwardly, so as to permit raising of the injection unit C.

The upper mold stack support E comprises a pair of substantially fork-shaped toggle levers 189 and 190 pivotally mounted at 191 and 192, respectively, on a pair of transverse frame members 193 extending between and welded to the angle irons 30—33 and 31—32. Stops 194 and 195 rigidly affixed to the angle irons 33 and 31 underlie and define the rest positions of the "handle" portions of the toggle levers 189 and 190. Pivotally connected to the latter at 196 and 197 and disposed within the confines of the facing forked portions of the respective toggle levers 189 and 190 are U-shaped rocker frames 198' and 199' to which are affixed pawls 198 and 199 the hooked ends of which are adapted to overlie the uppermost mold plate (146 in Fig. 16) of the stack being advanced through the heating unit F. Fixed stops 200 and 201 mounted on the transverse frame members 193 limit the extent of rocking of the pawls 198 and 199 toward the mold stack, and further fixed stops 202 and 203 mounted on the angle irons 32 and 30, respectively, limit the extent of rocking of these pawls away from the mold stack.

The rocker frame 198' located adjacent one side of the frame A is integral with a transmission lever 204 which extends from the pivot location 196 toward and through the opposite sides of the frame A, i.e., between the angle irons 30 and 31, and similarly the rocker frame 199' located adjacent the last-named angle irons is integral with a transmission lever 205 extending from the pivot location 197 through the angle irons 32 and 33 of the frame A. Adjacent its outermost end, the lever 204 is provided with an aperture 206, and the lever 205 is provided with an aperture 207 adjacent its outermost end. Affixed to the frame A at a predetermined distance below the levers 204 and 205 are two brackets 208 and 209 provided with apertures 210 and 211, respectively. Tension springs 212 and 213 are anchored, respectively, at one end to the brackets 208 and 209 and at their other ends to the outermost ends of the levers 204 and 205. Extending freely through the apertures 206 and 210 of the lever 204 and bracket 208, as well as through an aperture 214 of a transverse bracket 215 rigidly connected with the injection unit mounting block 76, is a rod 216 provided intermediate its ends with adjustably fixed bushings 217 and 218, the former of which underlies the lever 204, and the latter of which underlies the bracket 208. Similarly, a rod 219 provided with adjustably fixed bushings 220 and 221 extends freely through the apertures 207 and 211 of the lever 205 and bracket 209, as well as through an aperture 222 of a second transverse bracket 223 rigidly affixed to the injection unit mounting block 76 and extending to the side thereof opposite to that to which the bracket 215 extends. Positioned about the rod 216 and bearing against the bushing 218 and bracket 215 is a compression spring 224, and a like compression spring 225 is arranged on the rod 219 between the bushing 221 and the bracket 223. The springs 224 and 225 are much stiffer than the springs 212 and 213.

The functioning of the upper and lower mold stack supports E and E', therefore, is as follows:

With a full stack of mold plates supported between the pawls 187—188 and 198—199, the exertion of a downward force on the top of the stack by the mold disassembly mechanism G (the details of which will be described presently) will push the lower pawls 187 and 188 down and thus effect a downward rocking of the toggle levers 181 and 182 about their pivots 183 and 184 against the forces of the springs 179 and 180. The toggle lever 181 thereby closes switch $S_4$ to effect raising of the injection unit C, and a mold plate located on the sprue plate at that time will be forced up into the stack, the pawls 187 and 188 being rocked outwardly by such mold plate until the latter is above the hooked ends of these pawls which are then returned to their stack-supporting positions by gravity.

As the injection unit C rises, the springs 224 and 225 transmit the upward motion of the brackets 215 and 223 to the rods 216 and 219 via the bushings 218 and 221, respectively. Due to the positioning of the bushings 217 and 220, upward forces are exerted against the levers 204 and 205, the springs 212 and 213 being sufficiently weak as to offer little resistance to displacement of these levers. Under the influence of the said upward forces, the toggle levers 189 and 190 are first rocked slightly upwardly about their pivots 191 and 192 to release the hooked ends of the pawls 198 and 199 from the top of the mold plate stack. As the rods 216 and 219 now continue their upward movement, the levers 204 and 205 and their associated pawl-carrying rocker frames 198' and 199' are rocked about their pivots 196 and 197 to completely disengage the pawls 198 and 199 from the uppermost mold plate, the maximum possible displacement of the pawls being limited by the stops 202 and 203. The arrangement is so preset that as soon as the pawls have been rocked away from the uppermost mold plate, the bushings 218 and 221 contact the brackets 208 and 209, whereupon all further movement of the rods 216 and 219 is interrupted. Should the injection unit C and the brackets 215 and 223 still continue to rise, the only effect will be a further compression of the springs 224 and 225. When the disassembly mechanism G has been retracted with the hitherto uppermost mold plate, as more fully described hereinafter, the injection unit is lowered and the pawls 198 and 199 are returned to their normal positions by the springs 212 and 213.

*The heating unit*

The stack of mold plates when supported by the above-described supports E and E' is guided through the heating unit F which, as best shown in Fig. 8, comprises a rectangular thermally insulated housing 226 at the respective corners of which are arranged eight guide rods 176, the lowermost ends of six of which (the upper six in Fig. 8) have already been referred to hereinabove as the means for defining the terminal position for each mold plate on the landing D. The remaining two guide rods 176 (the one along the lower edge of Fig. 8) do not extend fully to the landing D, but are terminated a short distance above the same, as shown in Fig. 1, so as not to interfere with movement of the mold plates along the running track 167–168. The guide rods 176 within the confines of the housing 226 of the heating unit F maintain the mold plates in proper horizontal and parallel relationship and guide them vertically upward toward the upper end of the stack. The interior of the housing 226 is raised to the proper curing temperature by a plurality of rod-shaped heating elements 227 located at the respective corners of the housing and by a plurality of plate-shaped heating elements 228 located at the respective sides of the housing. The current flow through these heating elements, and thus the temperature within the housing 226, is controlled through the intermediary of the knobs 122 on the control panel 119 which regulate in any suitable manner the power output of the transformer 120 as indicated on the meters 121.

*The mold disassembly mechanism*

Rigidly mounted in a cross strut frame 229 affixed to the upper end of the frame A (Figs. 1 and 2) is a double-acting pneumatic motor 230 provided with reversing actuating terminals 230a and 230b and an air inlet tube 231, and including a cylinder 232 and a piston (not shown) reciprocal therein and having a piston rod 233 extending slidably through the lower end of the cylinder and through the center of the cross member 35' of the channel iron structure 35—35' bolted to the top of the frame. At its lowermost, free end the piston rod 233 carries a head 234 to the opposite sides of which are pivoted two vertically depending pawls 235 and 236 adapted to lift the mold plates 145 and 146 from the stack one at a time. The pawls 235 and 236 carry outwardly projecting, U-shaped brackets 237 and 238, respectively, to the outermost ends of which are connected springs 239 and 240 anchored at their other ends to small projections 241 and 242 affixed to the frame A. Also supported by the frame at the opposite sides thereof and within the confines of the brackets 237 and 238 are two vertically slotted guide plates 243 and 244 through the slots of which project guide pins 245 and 246, the function of which is primarily to prevent any twisting and ensure accurate alignment of the pawls 235 and 236 relative to the mold plate stack emerging from the heating unit F or relative to the track leading to the ejector mechanism still to be described. Disposed on the head 234 and about the piston rod 233 are spacer plates 247 which limit the extent of retraction of the head 234 upon their abutment against the lower surface of the channel iron structure 35—35'. At least one of these plates may be made of a suitable insulating material to inhibit radiation of heat upwardly from the stack of mold plates toward the ceiling of the room in which the machine is set up. Switches $S_6$ and $S_{16}$ are suitably mounted on the frame adjacent the path of movement of the disassembly mechanism, the former switch to be closed upon retraction of the piston rod 233, and the latter switch to be closed upon downward movement of the piston rod and the pawls carried thereby.

In operation, assuming that a mold plate has been displaced from the disassembly pawls 235 and 236 by the repositioning mechanism H (not yet described), upon subsequent advancing or downward movement of the piston rod 233 and head 234 due to energization of the terminal 230a of the motor 230, the pawls 235 and 236 will, upon contacting the uppermost mold plate of the stack, be displaced or rocked outwardly about their respective pivots against the forces of the springs 239 and 240. As soon as the hooked ends of these pawls have passed below the plane of the uppermost mold plate (or below the plane of the runners thereof) they will be urged in the opposite direction by the aforesaid springs so that, upon retraction of the piston rod 233 the uppermost mold plate will be supported by the hooked ends of the pawls 235 and 236 and removed from the stack.

*The mold plate repositioning mechanism*

The means H provided for shifting the disassembled mold plates from the pawls 235 and 236 toward the mold plate release-catch lever mechanism I comprise a double-acting pneumatic motor 248 mounted on the auxiliary frame A' and provided with reversing actuating terminals 248a and 248b and an air inlet tube 249, and further including a cylinder 250 and a piston (not shown) reciprocal therein, the piston being provided with a piston rod 251 carrying a head 252 in which is mounted a pusher rod 253 projecting into the frame A between the angle irons 31 and 32. Switch $S_3$ is mounted adjacent the front end of the cylinder 250 so as to be closed by the head 252 of the piston rod 251 upon retraction of the latter. As will be understood from Figs. 1, 9 and 10, when the piston rod 251 is protracted upon energization of the terminal 248a, the pusher rod 253 will shift a mold plate then supported by the pawls 235 and 236 to the mechanism I which will now be described.

*The mold plate release-catch lever mechanism*

Referring now in particular to Figs. 1 and 9 to 12, it will be seen that lateral guide members 254 and 255 are fixedly mounted on a transverse mounting plate 256 extending between and welded to the angle irons 30 and 33, the guide members 254 and 255 projecting outwardly of the frame A. The guide members on the adjacent and facing sides thereof are provided with upper and lower horizontal ledges 254'—254" and 255'—255" and thus define a horizontal guide track for the mold plates to be removed from the disassembly mechanism G by the pusher rod 253 of the repositioning mechanism H. As shown in Fig. 10, at the entry to this guide track the upper and lower ledges of the guide members are curved outwardly so as to eliminate the possibility of the leading edge of a mold plate catching against the end of one of these ledges.

The guide member 255 is provided intermediate its ends with a downwardly depending lug 257 carrying a horizontal pivot pin 258 on which is rockably mounted a catch lever 259. To one end of the catch lever 259 is connected a spring 260 which is anchored at its other end to a projection 261 on the angle iron 30 of the frame A and normally biases the lever to the indicated position. At its other end the lever 259 carries an upwardly extending catch member 262, the guide ledge 255" being cut away a short distance before the discharge end of the guide member 255 in order to enable the catch-member 262 to be disposed adjacent the guide member 255 in a position blocking exit from the guide track of the mechanism I. At a location intermediate the pivot 258 and that end to which the spring 260 is connected, the catch-lever 259 carries an upstanding arm 263 the upper portion 264 of which is U-shaped and bridges the guide member 255, the free end of the U-shaped portion 264 extending downwardly in close proximity to the inner face of the guide member 255 through a break or recess 264' provided in the guide ledge 255'. The free end of the U-shaped portion 264 facing the repositioning mechanism H is provided with a slanted surface 265. Both the ledges 254' and 255' are also cut away at the discharge end of the guide track for a purpose which will become clear presently. Switches $S_8$ and $S_{12}$ are positioned beneath the guide track for the mold plates adjacent the guide members 254 and 255, respectively, to be actuated by the thick central bodies 147 of the cavity plates 145. For the sake of clarity, no mold plate is shown in Fig. 11.

From the foregoing, it will be appreciated that if a first mold plate is positioned adjacent the discharge end of the guide track 254—255 while a second mold plate is supported by the disassembly pawls 235 and 236 (see Fig. 9), the first mold plate is prevented from falling out of the guide track by virtue of the presence of the catch member 262 which intercepts the guide track due to the biasing action of the spring 260 on the catch lever 259. Upon energization of the terminal 248a of the motor 248 and consequent advancement of the pusher rod 253, the second mold plate enters the guide track 254—255, and when it comes into contact with the slanted surface 265 of the U-shaped portion 264, the arm 263 and the lever 259 are cammed and rocked upwardly against the force of the spring 260 about the axis of the pivot pin 258. As a result, the catch member 262 is displaced downwardly and frees the discharge end of the guide track, so that when the second mold plate contacts the trailing edge of the first mold plate, the latter is pushed forwardly and permitted to fall out of the guide track into the mold plate return mechanism K still to be described. This falling out is greatly facilitated by the cutting away of the guide ledges 254' and 255', since the first mold plate can effectively rock downwardly about the outer edges of the ledge 254" and the catch member 262 without interference by the upper ledges 254' and 255'. As long as the second mold plate is still under the U-shaped arm portion 264, moreover, it maintains the latter and the catch lever 259 in their upwardly rocked position, thereby ensuring that the catch member 262 is not raised so as to interfere with the dropping movement of the first mold during discharge thereof. As soon as the second mold plate has passed the arm portion 264, however, the spring 260 snaps the lever 259 back into its starting position, whereby the catch member 262 again blocks the exit from the guide track.

*The ejector mechanism*

Rigidly mounted by means of a bracket 266 on the frame A, adjacent the upper end thereof and directly above and aligned with that portion of the guide track 254—255 in which mold plates are retained when the catch member 262 is raised, is a double-acting pneumatic motor 267 provided with reversing actuating terminals 267a and 267b and including a cylinder 268 and a piston (not shown) reciprocal therein and connected to a piston rod 269 extending slidably through the front or bottom end of the cylinder. The piston rod 269 carries a head 270 from which depend a plurality of ejector pins 271, preferably made of brass or like metal, the number of which corresponds, of course, to the number of mold cavities 148 in the mold plates 145. In accordance with the present invention, each ejector pin 271 is provided with a slightly conical or rounded tip 272 (see Fig. 14), which ensures that any molded articles contacted by the pins 271 during an ejection operation will not adhere to the pins once the articles have left the confines of the respective mold cavities 148, by virtue of the fact that the surface contact area has been reduced to a minimum. Switch $S_2$ is positioned to be closed by the head 270 of the piston rod 269 when the latter has reached the lowest point of its path of movement subsequent to the completion of an ejection operation. Arranged directly below the aforesaid portion of the guide track 254—255, for the purpose of receiving molded articles ejected from the cavity plates 145, is a receptacle 273 which is shown in Fig. 1 as positioned on a platform or mounting bracket 274 extending from one side of the frame A. It will, of course, be realized that the receptacle 273 need not be located in this position but may be disposed on the floor 36 adjacent the machine, with a chute (not shown) being provided and leading from the ejection location to the receptacle.

*The mold plate return mechanism*

As may be seen from Fig. 1, extending from the frame A and below the horizontal platform or bracket 274 is a further dual-plate mounting bracket structure 275 to the outermost end of which are connected the lowermost ends of a pair of vertical slanting guide plates 276 (only one of which is shown) connected intermediate their ends to the outermost portion of the bracket 274. The uppermost ends of the guide plates 276 are disposed substantially coplanar with the base of the guide track 254—255. Affixed to the inner surface of each of the guide plates 276 are two return track-defining rail members 277, which may be made of wire in order to reduce friction between the same and the mold plates when sliding therealong. Switch $S_1$ is mounted on one of the guide plates 276 so as to be closed by a passing mold plate. The uppermost end of the track defined by the rail members 277 effectively merges with the discharge end of the guide track 254—255, so that any mold plate displaced from the latter upon downward movement of the catch member 262 as a result of advancing of a further mold plate by the pusher rod 253 is able to fall immediately into the return track 277.

Pivotally mounted at 278 on the lower portions of the guide plates 276 is a substantially U-shaped transfer rocker 279 the opposite legs of which are provided with upwardly opening slots 280 sufficiently wide to accommodate the sides of a cover plate 146 or the runners 149 of a cavity plate. Extending across the base of the rocker 279, at the inner ends of the slots 280, is a bumper or shock absorber 281 made of Butyl rubber or like plastic material. In its rest position, as shown in Fig. 1, the transfer rocker is disposed with its slots 280 aligned with the return track 277. A cable 282 affixed to the upper end of the transfer rocker and passing over a pulley 283 carries a weight 284 disposed in an oil or other liquid type dashpot 285. A lever 286 extends from one side of the rocker 279, and switch $S_5$ is mounted to be closed by the free end of this lever when the rocker 279 is in its rest position. A latch 287 pivotally mounted at 288 on an extension of the frame member 157 associated with the mold plate feeding mechanism L (see also Fig. 5) is biased by a spring 289, anchored to one of the guide plates 276 or the bracket structure 275, in such a direction as to have its hooked end overlying the free end of the lever 286 so as to ensure retention of the transfer rocker in its rest position. In order to disengage the latch 287 from the lever 286, there is provided an actuator rod 290, the front end of which is rigidly connected to and movable with the rear face of the cross member 164 of the hereinbefore described pusher device 165, the free end of the actuator rod 290 contacting the latch 287 upon complete retraction of the pusher device 165 and pivoting the latch outwardly against the force of the spring 289.

Also mounted on one of the brackets 275 at the top thereof is a guide member 291 provided with a concavely curved front surface 292, the curvature of the latter being approxmately centered at the pivot point 278 of the transfer rocker 279. Affixed to each of the bracket plates 275 at the inner surface thereof is a curved guide rail 293 (only one of which is shown), these rails being spaced from one another a distance slightly greater than the width of the thick central body 147 of a cavity plate 145, substantially in the same manner as the side members of the rocker 279, the side legs 166 of the pusher device 165, and the rails 167 and 168.

In operation, assuming that a first mold plate has been released by the catch member 262 of the catch-release lever 259 while the pusher device 165 has been advanced to push a second mold plate along the running track 167—168 against the guide rods 176 and switch $S_{15}$, the first mold plate falls off the guide members 254 and 255 and into the return track 277, along which it slides until it is received in the slots 280 of the transfer rocker 279 which is then being held in the position shown in Fig. 1 by virtue of the fact that the latch 287 is in engagement with the free end of the lever 286. The bumper 281, as stated above, is made of Butyl rubber or the like which has very little resilience, even at room temperatures, so that rebounding of the mold plate upon hitting the bumper is practically eliminated. As the pusher device 165, having delivered the second mold plate to the landing arrangement D, is retracted, the rod 290 attached to the cross member 264 of the pusher device rocks the latch 287 outwardly against the force of the spring 289 and frees the lever 286, whereby the transfer rocker 279 and the first mold plate therein pivot in a counter-clockwise direction about the pivot 278 at a speed controlled by the dashpot 285 and weight 284. As the rocker 279 passes the horizontal and begins to tilt downwardly, the first mold plate starts to slide out of the slots 280, but it can only do so to a limited extent, since its front edge immediately comes into contact with the surface 292 of the guide member 291 past which the rocker 279 is swinging.

When the rocker 279 now reaches its lowest point of swinging movement where the slots 280 are aligned with the space beneath the guide member 291 and above the rails 293, the first mold plate again resumes its sliding movement out of the slots 280 and onto the rails 293 affixed to the bracket plates 275. At the beginning of the last-mentioned sliding movement, therefore, the weight 284 cannot return the rocker 279 to its starting position inasmuch as a part of the first mold plate is under the lower edge of the guide member 291, which ensures smooth launching of this mold plate along the inclined rails 293, while the rest of the first mold plate is still within the confines of the slots 280 of the rocker. As soon as the first mold plate has completely left the rocker, however, the weight 284 becomes effective to return the transfer rocker 279 in a clockwise direction to its starting position so as to align the slots 280 once again with the return track 277. Concurrently, the first mold plate slides along the rails 293 and ultimately drops onto the running track 267—268 in front of the legs 166 of the pusher device 165 until its forward movement is arrested by the nose 171 of the arm 170. When the pusher device is now again advanced by the mold plate feeding motor 161, the latch 287 is returned into locking engagement with the lever 286 of the rocker 279 preparatory to the arrival of the next mold plate via the track 277.

The electrical control circuit

Referring now specifically to Fig. 17, and remembering that the reference numerals associated with the various pneumatic motors are modified by "a" to designate the piston-advancing terminals, and by "b" to designate the piston-retracting terminals, of suitable solenoid valves substantially the same as those referred to in my above-mentioned copending application, it will be seen that a source of power, preferably a standard 110 v. line, is provided with lines 294 and 295 across which are connected by means of a line 296 the switch $S_9$, which is adapted to be closed upon advancement of the piston rod 113 of the injection operation-controlling motor 104, and the timer T which is adapted to be actuated by the switch $S_9$. A line 297 including a manually operable off-on switch $S_{20}$ (not shown in Figs. 1 to 16) connects a primary 298 of a step-down transformer 299 across the power source. An 8 v. output circuit includes the secondary 300 of the transformer and lines 301 and 302.

The switch $S_{19}$, which is adapted to be closed upon rising of the injection unit mounting block 76, is connected to the line 301 and by means of a line 303 to a manually operable double-throw switch $S_{17}$ mounted on the frame A (see Fig. 1). The switch $S_{17}$ is connected at one side by a line 304 to the retracting terminal 161b of the mold plate feeding motor 161 and by a line 305 to a line 306 which connects the switch $S_{11}$, adapted to be closed upon retraction of the piston rod 113 of the injection operation-controlling motor 104, to the retracting terminal 103b of the injection unit lift control motor 103, the switch $S_{11}$ being connected to a line 307 connected to the transformer secondary 300 in parallel with the line 301 and including a second off-on switch $S_{21}$ (not shown in Figs. 1 to 16). At its other side, the switch $S_{17}$ is connected by a line 308 to the double-throw switch $S_8$ located adjacent the guide member 254 of the mold plate release-catch lever mechanism I, the switch $S_3$ being connected at one side by a line 309 to the line 305, and at the other side by a line 310 to the advancing terminal 104a of the injection operation-controlling motor 104. Thus, it will be seen that the switch $S_{17}$ is designed to be manually operated so as to short-circuit the switch $S_8$, thereby to permit circulation of the mold plates through the machine without the necessity for carrying out any injection operations.

The switch $S_3$, which is adapted to be closed upon retraction of the head 252 of the piston rod 251 of the mold plate repositioning motor 248, is connected to the line 307 and in series with the advancing terminal 230a of the mold disassembly motor 230 by a line 311. The switch $S_5$, which is closed by the lever 286 attached to the transfer rocker 279 when the same is in its rest position, is connected to the line 307 and, by a line 312, in series with the retracting terminal 230b of the disassembly motor 230. The switch $S_7$, which is closed by the projection 175 of the pusher device 165 upon advancement thereof by the mold plate feeding motor 161, is connected to the line 307 and, by a line 313, in series with the advancing terminal 248a of the mold plate repositioning motor 248, and this switch is further connected in series with the reset switch $S_{13}$ carried by the platform 134 and with the advancing terminal 46a of the stock feeding motor 46 by a line 314.

The switch $S_2$, which is adapted to be closed upon advancement of the head 270 of the piston rod 269 of the ejector motor 267, is connected to the line 307 and, by a line 315, in series with the retracting terminal 248b of the repositioning motor 248, this switch being further connected in series with the retracting terminal 267b of the ejector motor 267 by a line 316. The switch $S_1$, which is adapted to be closed momentarily by mold plates sliding along the return track 277, is connected to the line 307 and, by a line 317, in series with the double-throw switch $S_{12}$ located adjacent the guide member 255 of the mold plate release-catch lever mechanism I, the last-named switch being connected at one side by a line 318 to the lines 315 and 316 and at the other side by a line 319 to the advancing terminal 267a of the ejector motor 267.

Also connected to the line 307 is the switch $S_{18}$ which is adapted to be closed upon lowering of the injection unit mounting block 76 and is connected in series with the switch $S_6$, adapted to be closed upon retraction of the piston rod 233 of the disassembly motor 230, and with the advancing terminal 161a of the mold plate feeding motor 161, by a line 320. The switch $S_{18}$ is further connected, by a line 321, in series with the switch $S_4$ adapted to be closed by downward rocking of the toggle lever 181 of the lower mold stack support E', the switch $S_{15}$ adapted to be closed upon arrival of a mold plate at its terminal position on the landing arrangement D as defined by the guide rods 176, the switch $S_{16}$ adapted to be closed upon downward movement or advancement of the piston rod 233 of the disassembly motor 230, and the advancing terminal 103a of the injection unit lift control motor 103. Switch $S_{14}$, which is adapted to be closed upon raising of the crossbar 127 due to advancing movement of the injection plunger 99 after engagement between the injection plunger-carried plate 132 and the crossbar-carried projection 131, and the switch $S_{10}$, which is adapted to be closed by the timer T upon completion of the injection operation, are connected by lines 322 and 323, respectively, to the retracting terminals 46b and 104b of the stock feeding motor 46 and the injection operation-controlling motor 104. All of the advancing and retracting terminals of the pneumatic motors are, of course, also connected to the line 302 so as to complete the circuit.

*The pneumatic and hydraulic systems*

The pneumatic system associated with the machine according to the present invention includes the various pneumatic motors and the air lines thereof, while the hydraulic system includes the lifting and injection motors and the valves 111 and 118 controlling the lines 84—85 and 101—102. Compressed air obtained under pressures of about 100 p.s.i. from any suitable source may be employed in the pneumatic system, and oil under higher pressures, ranging up to about 1700 p.s.i., may be employed in the hydraulic system. Inasmuch as both of these systems essentially are similar to the corresponding systems illustrated in my above-mentioned copending application, specific illustration and description of such systems herein are not provided.

*The operation of the machine*

Although the manner in which the various mechanisms and elements of the machine, arranged in accordance with the present invention, function has been set forth hereinabove in conjunction with the description of the said mechanisms and elements, it appears advisable to described one complete cycle of the operation of the machine so as to show explicitly the operational and sequential relationships which characterize the machine.

As a starting point, it is assumed that switches $S_{20}$ and $S_{21}$ are closed and that switch $S_{17}$ is in the position illustrated in Fig. 17. It is further assumed that the transfer rocker 279 has just discharged a first cavity plate 145 down the guide track 293 and has been returned to its starting position by the weight 284. As a final starting condition, it is assumed that the injection unit mounting block is down, closing switch $S_{18}$, and that the disassembly pawls 235 and 236 have just lifted a second cavity plate 145 from the top of the mold plate stack emerging from the heating unit F and are being retracted by the disassembly motor 230 due to the closing of switch $S_5$. Although the lower part of the thick central body of the first cavity plate projects below the track 293, its sliding movement is not hindered by the legs 166 of the pusher device since these legs too are spaced from one another a distance slightly greater than the width of the central cavity plate body.

Retraction of the disassembly pawls 235 and 236 effects closing of the switch $S_6$. Since now both $S_6$ and $S_{18}$ are closed, the circuit to the advancing terminal 161a of the mold plate feed motor 161 is completed and the pusher device 165 is thus advanced to depress the catch arm 170 and its nose 171 and to shift the aforesaid first cavity plate against the guide rods 176 defining the terminal position for this cavity plate on the running track 167—168 of the landing arrangement D. During the forward motion of the pusher device, the switch $S_7$ is closed by the projection 175, which completes the circuit to the advancing terminal 248a of the repositioning motor 248, actuating the latter to advance the pusher rod 253 so as to displace the lifted second cavity plate 145 from the pawls 235 and 236 onto the guide track 254—255 of the mold plate release-catch lever mechanism I. When the first cavity plate reaches its terminal position, of course, switch $S_{15}$ is closed.

As the second cavity plate is being pushed along the guide track 254—255, the thick central body 147 thereof, which depends downwardly through the space between the lower guide ledges 254" and 255", throws the switches $S_8$ and $S_{12}$ out of their normal positions shown in Fig. 17 and into the alternate positions indicated. At the same time, the aforesaid second cavity plate is pushing a first cover plate, which was previously located beneath the ejector mechanism J, over the edge of the guide track 254—255, due to the upward rocking of the arm 263 and concurrent downward rocking of the catch member 262 of the lever 259, and into the return track 277.

At this stage, with switch $S_{12}$ thrown to its alternate position, the first cover plate sliding along the return track 277 momentarily closes switch $S_1$ which completes the circuit to the advancing terminal 267a of the ejector motor 267 via the line 319. As a result, the piston rod 269 and the ejector pins 271 carried thereby are lowered and the molded articles ejected from the said second cavity plate now located therebelow. As the piston rod 269 reaches its lowest point of travel, the head 270 closes switch $S_2$ which completes the circuit to the retracting terminal 248b of the repositioning motor 248 as well as the circuit to the retracting terminal 267b of the ejector motor 267. Upon complete retraction of the piston rod 251 of the motor 248, the head 252 closes switch $S_3$ which completes the circuit to the advancing terminal 230a of the disassembly motor 230, pushing the pawls 235 and 236 and the head 234 carrying the same against the top of the mold plate stack emerging from the heating unit and now constituted by a second cover plate 146. As the disassembly pawls are advanced, switch $S_{16}$ is closed, and as pressure is applied to the top of the mold plate stack, the toggle levers 181 and 182 of the lower mold stack support mechanism E' are rocked downwardly, whereby switch $S_4$ is closed.

Since the switches $S_{18}$, $S_4$, $S_{15}$ and $S_{16}$ are now closed, the circuit to the advancing terminal of the injection unit lift control motor 103 is closed via line 321, whereby the piston rod 106 of this motor is advanced to operate the valve 111 so as to admit hydraulic pressure fluid into the bottom of the lift motor cylinder 79 via conduit 84 to raise the piston rod 83 and therewith the mounting block 76 and the entire injection unit C carried thereby. The sprue plate 88 is thus brought into contact with the lower surface of the aforesaid first cavity plate 145, and, since the width of the sprue plate and injection unit mounting block is substantially the same as that of the thick central portion 147 of the said first cavity plate, the latter is lifted off the running track 167—168 and displaced against the lowermost mold plate of the stack (a cover plate) to be moved through the heating unit F. As already explained hereinabove, this not only causes the lifted second cavity plate to rock the pawls 187 and 188 outwardly, but it also causes the upper hold-down pawls 198 and 199 to be rocked away from the top of the mold plate stack through the intermediary of the springs 224 and 225, the rods 216 and 219, and the levers 204 and 205, whereby the entire force exerted by the injection unit is taken up by the disassembly motor 230 (which may be aided also by a suitable U-shaped spacer block or frame, not shown, to be inserted automatically into the space between the upper spacer plate 247 carried by the piston rod head 234 and the lower surface of the cross member 35′ of the channel iron structure 35—35′ so as to cause a great part of this force to be taken up by the frame A itself).

As the injection unit mounting block 76 is being raised, the projection 76′ thereof closes switch $S_{19}$ which, with switch $S_8$ still in the thrown position, completes via lines 303, 308 and 310 the circuit to the advancing terminal 104a of the injection operation-controlling motor 104. When the piston rod 113 of the latter is now advanced to operate the valve 118 so as to admit hydraulic pressure fluid to the bottom of the injection motor cylinder 94 via the conduit 101 for the purpose of advancing the injection plunger 99, switch $S_9$ is closed to set the timer T in operation.

The injection operation now proceeds, as already explained hereinabove, with the head 100 of the injection plunger 99 cutting off the stock within the injection cylinder 86 from the stock located just outside the inlet opening 87. As the plunger 99—100 continues to rise, forcing the stock from the injection cylinder through the passageways 91 and orifices 90 of the sprue plate 88 into the mold cavities 148 of the aforesaid first cavity plate 145, the plate 132 attached to the plunger engages the projection 131 of the upstanding strip 130 connected with the upper slidable crossbar 127 and entrains the latter as well as the lower crossbar 128 into upward movement. The upper crossbar 127 thus closes switch $S_{14}$ which completes the circuit to the retracting terminal 46b of the stock feeding motor 46, whereby the piston rod 47 thereof is retracted and therewith the jaws 54 and 55 and, through the intermediary of the jaws 63 and 64 and the springs 66 and 67, the stock 72 in order to separate the front and severed end of the latter from the inlet opening 87 of the injection cylinder 86. After the lower crossbar 128 has risen a certain distance with the plunger 99, the reed 141 contacts the plunger 136 of the reset switch $S_{13}$ to open the latter, and for the time being it is assumed that even upon completion of this injection operation there will remain in the injection cylinder 86 more than a predetermined minimum quantity of molding stock. Accordingly, when the platform 135 is subsequently raised by the reed 141 during the final stage of the injection plunger movement, it will not be raised sufficiently to bring the plunger 137 of the reset switch $S_{13}$ into contact with the weight or reset member 142 mounted on the rod 126, whereby the reset switch will remain open.

When the predetermined time interval for the injection operation has passed, the timer T closes switch $S_{10}$ which completes the circuit to the retracting terminal 104b of the injection operation-controlling motor 104, whereby the piston rod 113 thereof is retracted to actuate the valve 118 so as to admit pressure fluid into the upper end of the injection motor cylinder 94 via the conduit 102 for the purpose of retracting the plunger 99. Upon full retraction of the piston rod 113, the switch $S_{11}$ is closed to complete via the line 306 the circuit to the retracting terminal 103b of the injection unit lift control motor 103, whereby the piston rod 106 thereof is retracted to operate the valve 111 so as to admit pressure fluid into the upper end of the lift motor cylinder 79 through the conduit 85 to lower the mounting block 76 and therewith the entire injection unit C away from the bottom of the mold stack, which permits the pawls 187 and 188 to rock back into their normal position and engage the lower surfaces of the runners 149 of the aforesaid first cavity plate 145 which is now filled with molding stock 72. Concurrently, closing of the switch $S_{11}$ completes the circuit to the retracting terminal 161b of the mold plate feed motor 161 via lines 306, 305 and 304 to retract the pusher device 165 together with the rod 290 attached to the cross-member 164 of the said pusher device. When the latter has been fully retracted, the rod 290 rocks the latch 287 away from the lever 286 of the transfer rocker 279, permitting the latter to rock in a counter-clockwise direction under the weight of the first cover plate which had fallen thereinto from the track 277. This plate is, therefore, delivered to the guide track 293 and slides onto the initial part of the running track 167—168 where its forward motion will be stopped by the nose 171 of the catch arm 170.

As soon as the transfer rocker 279 is empty, it is returned to its rest position by the weight 284, whereupon the lever 286 closes the switch $S_5$ to effect retraction of the disassembly pawls 235 and 236 by means of the motor 230 (the hereinabove mentioned spacer block, if the same had been employed, having been already retracted from the space between the spacer plates 247 and the channel iron structure 35—35′). These pawls, of course, now support the aforesaid second cover plate which they removed from the top of the stack. When the piston rod 233 has been fully retracted, the switch $S_6$ is closed and this permits, due to the fact that the switch $S_{18}$ is also closed by the lowered mounting block 76, advancement of the pusher device 165 by the mold plate feed motor 161 to shift the first cover plate previously released from the transfer rocker 279 against the guide rods 176 on the running track 167—168. During advancement of the pusher device, switch $S_7$ is again closed to permit actuation of the repositioning motor 248 for the purpose of advancing the pusher rod 253 to shift the second cover plate now held by the disassembly pawls from the latter onto the guide track 254—255. At this time, however, since the reset switch $S_{13}$ was not raised sufficiently to be closed by the weight 142, the stock feed motor 46 remains inactive, and no additional stock 72 is fed into the injection cylinder 86 inasmuch as the latter, at the termination of the preceding injection operation, still contained more than the predetermined minimum quantity of stock needed for the next injection operation.

The second cover plate being advanced along the guide track 254—255 has no part thereof projecting below this guide track, and neither of the switches $S_8$ and $S_{12}$ is thus thrown out of its normal position. This cover plate does, however, operate the catch lever 259 in the described manner and thus pushes the now empty second cavity plate theretofore located beneath the ejector mechanism J over the edge of the guide track and into the return track 277. As this cavity plates rides along the return track 277, it closes switch $S_1$ which, in view of the fact that switch $S_{12}$ was not thrown out of its normal position, completes the circuit to the retracting terminal 248b of the repositioning motor 248 as well as to the retracting terminal 267b of the ejector motor 267, whereby the latter remains inactive since no ejection is to take place. Upon complete retraction of the piston rod 251 of the repositioning motor 248, the switch $S_3$ is closed to actuate the disassembly motor 230 so as to advance or lower the disassembly pawls 235 and 236 against the top of the mold stack (now constituted by a third and filled cavity plate). As a result, switch $S_{16}$ is closed by the disassembly pawls and switch $S_4$ by the downwardly rocked toggle lever 181 which, in conjunction with the closing of switch $S_{15}$ by the first cover plate on the landing arrangement D, causes the injection unit lift control motor 103 to be actuated to advance the piston rod 106 and operate the valve 111 to admit hydraulic pressure fluid into the lower end of the lift motor cylinder 79, to thereby raise the mounting block 76 and the sprue plate 88 and therewith the said first cover plate contacted from below by the sprue plate.

The manner in which the so-lifted first cover plate is added to the bottom of the mold plate stack is identical with the manner in which the above-mentioned first cavity plate was added to the stack, involving the displacement of the lower pawls 187 and 188 and the upper pawls 198 and 199, and a description of this operation thus need not be repeated here. As before, the U-shaped spacer block may be first inserted automatically into the space above the head 234 and below the channel iron structure 35—35'. It will, however, be understood that at this time no injection is to take place since a cover plate is located on the sprue plate. This is assured by virtue of the fact that the switch $S_8$ was not thrown out of its normal position by the second cover plate on the guide track 254—255, so that when switch $S_{19}$ is closed during the rise of the injection unit mounting block 76, a circuit is completed via lines 303, 308, 309, 305 and 306 to the retracting terminal of the injection unit lift control motor 103 to cause reversal of the valve 111 for the purpose of lowering the mounting block 76, the injection operation-controlling motor 104 remaining inactive at this time. Concurrently, closing of the switch $S_{19}$ completed a circuit via lines 303, 308, 309, 305 and 304 which permitted retraction of the pusher device 165 by means of the mold plate feed motor 161, which in turn enables the rod 290 to rock the latch 287 away from the lever 286 so as to permit the transfer rocker 279 to dispatch the previously received second cavity plate down the guide track 293.

At this point, the hereinbefore mentioned starting conditions have again come about and one complete operational cycle has been completed, and the next cycle will then proceed exactly as described hereinabove except for the fact that when the quantity of stock in the injection cylinder 86 falls below the predetermined minimum, the weight 142 will be contacted by the reset switch $S_{13}$ to close the latter and permit feeding of additional stock 72 into the injection cylinder whenever switch $S_7$ is closed.

The operation of the machine is in no way altered if the cover plates 150 are used in lieu of the cover plates 146, since the central body of each cover plate 150, although thicker than any of the cover plates 146, is not sufficiently thick to actuate the switches $S_8$ and $S_{12}$ and since there is always sufficient space between the various pairs of guide rails and ledges along which the plates ride to permit the pins 156 to project between the same without interfering in any manner with the movements of the plates 150.

The raw molding stock injected into the various cavities 148 of the cavity plates 145 is, of course, cured while the respective cavity plates are disposed within the confines of the housing 226 of the heating unit F. The temperature within this housing is so regulated, and in conjunction therewith the speed at which the various mold plates are cycled through the machine is so preset, that each cavity plate stays within the heating unit housing 226 for the precise period of time required to completely cure the molding stock injected into that cavity plate. Thus, the possibility of overcuring or undercuring of the molding stock is substantially eliminated.

When switch $S_{17}$ is thrown to its alternate position indicated in Fig. 17, the various mold plates may be cycled through the machine exactly as set forth hereinabove except for the fact that no injection will take place. This will be readily understood when it is noted that with this switch in its alternate position, no circuit to the advancing terminal 104a of the injection operation-controlling motor 104 can ever be completed.

In addition to the foregoing, a number of refinements may be added to the machine without altering its fundamental character or operational principles. By way of example, suitable brushing or scraping means may be positioned along the path of travel of the mold plates along the return track 277 for the purpose of removing from the surfaces of these plates any particles of cured molding stock still adhering thereto. Such particles, if not removed, might prevent flush surface to surface contact between adjacent mold plates during and subsequent to the injection operation, with the possible detrimental result of stock creeping out from the mold cavities 148 and rendering the finished articles unfit for use. Still further, means may be provided adjacent the transfer rocker 279 for spraying the mold plates, when retained therein, with a suitable adhesion-inhibiting fluid or other substance. In this manner, the possibility, that when a cavity plate is lifted off the stack by the disassembly pawls 235 and 236, the molded articles in this cavity plate might stick to the immediately lower cover plate and be drawn out of the cavities 248 before shifting of the cavity plate to the ejector mechanism by the repositioning motor 248, is completely avoided.

I have described hereinabove a preferred embodiment of my invention as well as certain possible modifications of individual parts thereof, but it is understood that this disclosure is for the purpose of illustration only and that various omissions and changes in shape, proportion and arrangement of the parts, as well as the substitution of equivalent elements for the arrangements shown and described, may be made without departing from the scope of the present invention as set forth in the appended claims.

Having thus described my invention, what I claim and desire to protect by Letters Patent is:

1. An automatic molding machine, comprising a pair of means for supporting from both ends a compact stack of a plurality of mold plates including cavity plates and cover plates arranged in alternating sequence, landing means for positioning said mold plates individually adjacent one end of said stack, means for transferring said mold plates one at a time from said landing means to that one of said supporting means adjacent said landing means, means for injecting molding stock into each of said cavity plates as the same is transferred to said one supporting means, means for feeding a supply of said molding stock into said injecting means prior to an injection operation and including means for retracting said supply of molding stock from the entrance to said injecting means during an injection operation, control means for inhibiting actuation of said stock feeding means in response to presence of more than a predetermined minimum quantity of said molding stock in said injecting means, means interconnecting said transferring and injecting means with the other of said supporting means for releasing the latter from the second end of said stack upon operation of said transferring and injecting means, means for taking up the forces exerted on said stack by said transferring and injecting means and for removing said mold plates one at a time and in the same alternating sequence from said second end of said stack upon release therefrom of said other supporting means, means spaced from said removing means for ejecting the molded stock from said cavity plates, means for displacing said mold plates individually from said removing means and into juxtaposition with respect to said ejecting means, means for actuating said ejecting means only in response to displacement thereto of said cavity plates, and means for returning said mold plates in the same alternating sequence from said ejecting means to said landing means.

2. A molding machine according to claim 1, said supporting means being independent of one another and comprising a pair of multi-pawl devices the pawls of which are engageable with the remote faces, respectively, of the opposite end mold plates of said stack, first rockable means mounting said pawl device of said one supporting means for free rocking movement toward and away from the respective one of said end mold plates, first spring means operatively connected to said first rockable means for normally biasing the same in such a direction as to force said pawls thereof, when rocked toward said one end mold plate, against the latter, second rockable means mounting said pawl device of said other supporting means for rocking movement toward and away from the other end mold plate of said stack, lever means integral with said pawls of said last-named pawl device, and second spring means operatively connected to said lever means for normally biasing said last-named pawls so as to remain in engagement with said other end mold plate.

3. A molding machine according to claim 2, said interconnecting means comprising rod means bearing adjacent one end thereof against said lever means in a direction opposing the biasing action of said second spring means, said rod means being resiliently connected adjacent the other end thereof to said transferring and injecting means.

4. A molding machine according to claim 1, said landing means comprising a pair of parallel, stationary rails spaced from one another a distance smaller than the overall width of each of said mold plates and slightly larger than the width of a predetermined central portion of each of said cavity plates, guide rod means arranged to be engageable by each mold plate upon its arrival at said landing means to position each mold plate precisely with respect to said stack and said transferring and injecting means, and means actuatable by each mold plate only when the latter engages said guide rod means for rendering said transferring and injecting means operative.

5. A molding machine according to claim 4, said returning means comprising first track means adapted to receive and guide each mold plate shifted out of juxtaposition with respect to said ejecting means upon shifting into such juxtaposition of the next mold plate by said displacing means, a transfer rocker pivotally mounted adjacent the discharge end of said first track means and provided with slotted means adapted to receive a mold plate leaving said first track means, latch means normally retaining said transfer rocker in its mold plate receiving position, second track means leading to said rails of said landing means, said transfer rocker being pivotable out of said receiving position thereof and into a discharge position for permitting a mold plate theretofore held by said slotted means to enter said second track means so as to slide onto said rails, means connected to said transfer rocker for returning the same to said receiving position thereof, means for arresting movement of said last-named mold plate along said rails in advance of the terminal position of the said mold plate as defined by said guide rod means, and reciprocal means operable when moved toward said guide rod means for rendering said arresting means inoperative and for feeding the mold plate previously stopped thereby along said rails to said terminal position, and further operable when moved away from said guide rod means for disengaging said latch means from said transfer rocker so as to permit pivoting of the latter to said discharge position thereof under the weight of the next mold plate when received in said slotted means.

6. A molding machine according to claim 4, said transferring and injecting means comprising a mounting block arranged on that side of said rails of said landing means remote from said one supporting means, first hydraulic motor means provided with a reciprocal piston operatively connected to said mounting block for moving the same linearly toward and away from said rails, sprue means carried by said mounting block at that portion thereof facing said landing means and arranged substantially coaxially with the terminal position of each mold plate on said landing means as defined by said guide rod means, the width of said sprue means and said portion of said mounting block being slightly smaller than the space between said rails, to thereby permit said sprue means and mounting block portion to pass through said space so as to engage a mold plate when the same is located in said terminal position thereof, an injection cylinder carried by said mounting block for movement therewith and oriented at an angle to the line of movement of said mounting block, an injection plunger reciprocal within said injection cylinder, the interior of the latter being in communication with said sprue means to enable said molding stock to be forced by said plunger through said sprue means when the latter is in engagement with a cavity plate into which said stock is to be injected, and second hydraulic motor means provided with a reciprocal piston operatively connected to said plunger for moving the same toward and away from said sprue means.

7. A molding machine according to claim 6, said stock feeding and retracting means comprising a platform carried by said mounting block and movable therewith and with said injection cylinder, a plate slidably mounted on said platform for reciprocal movement toward and away from said injection cylinder and adapted to support a portion of said supply of molding stock, first and second stops on said platform for defining the limits of said movement of said plate toward and away from said injection cylinder, respectively, resilient means biasing said plate in the direction of said second stop, pneumatic motor means mounted on said platform and including a reciprocal piston rod provided with a head, a first pair of spring-biased jaws pivotally mounted on said head above said plate and on opposite sides of the path of movement of said portion of said supply of molding stock and adapted to grip the latter upon displacement of said piston rod with said head toward said injection cylinder, a second pair of spring biased jaws pivotally mounted on said plate and facing in the same direction as said first pair of jaws, first abutment means carried by said plate for engagement by said head upon displacement of said piston rod toward said injection cylinder, and second abutment means adjustably carried by said platform for engagement by said head upon displacement of said piston rod away from said injection cylinder.

8. A molding machine according to claim 1, said ejecting means comprising pneumatic motor means including a reciprocal piston rod provided with a head carrying at least one ejector pin engageable, upon protraction of said piston rod toward a cavity plate located in juxtaposition with respect to said pneumatic motor means, with the molded stock retained in said cavity plate, said ejector pin at its stock-engaging end being provided with a reduced contact surface area to inhibit adhesion of the molded stock to said pin.

9. An automatic molding machine, comprising mutually independent means for supporting from both ends a compact stack of a plurality of mold plates including cavity plates and cover plates arranged in alternating sequence, landing means for positioning said mold plates individually adjacent one end of said stack, means for transferring said mold plates one at a time from said landing means to that one of said supporting means adjacent said landing means, means for injecting plastic molding stock into each of said cavity plates as the same is transferred to said one supporting means, means for feeding a supply of said molding stock into said injecting means and including means for retracting said supply of stock from the entrance to said injecting means during an injection operation, means interconnecting said transferring and injecting means with the other of said supporting means for releasing the latter from the second end of said stack upon operation of said transferring and injecting means, means for taking up the forces exerted on said stack by said transferring and injecting means and for removing said mold plates one at a time and in the same alternating sequence from said second end of said stack upon release therefrom of said other supporting means, means for displacing each of said mold plates individually from said removing means, means for ejecting the molded stock from said cavity plates and arranged to be actuated only in response to displacement of the latter from said removing means, and means for returning said mold plates in the same alternating sequence from said ejecting means to said landing means.

10. A molding machine according to claim 9, said stock feeding and retracting means comprising a platform, a plate slidably mounted on said platform for reciprocal movement toward and away from said injecting means and adapted to support a portion of said supply of molding stock, a pair of stops on said platform at different distances from said injecting means for defining the limits of said movement of said plate relative to said injecting means, resilient means biasing said plate in the direction of that one of said stops which is farther from said injecting means, power-operated reciprocal means mounted on said platform, a first pair of spring-biased jaws carried by said reciprocal means above said plate and on opposite sides of the path of movement of said portion of said supply of molding stock and adapted to grip the latter upon displacement of said reciprocal means toward said injecting means, a second pair of spring-biased jaws mounted on said plate on opposite sides of said path of stock movement and facing in the same direction as said first pair of jaws, fixed abutment means carried by said plate for engagement by said reciprocal means upon displacement of the latter toward said injecting means to thereby ensure movement of said plate toward the one of said stops nearer said injecting means, and adjustable abutment means mounted on said platform for engagement by said reciprocal means upon displacement of the latter to a predetermined extent away from said injecting means, whereby upon separation of said reciprocal means from said fixed abutment means said resilient means return said plate toward the first-mentioned one of said stops to permit said second pair of jaws to retract said portion of said supply of molding stock away from said injecting means.

11. An automatic molding machine, comprising mutually independent means for supporting from both ends a compact stack of a plurality of mold plates including cavity plates and cover plates arranged in alternating sequence, landing means for positioning said mold plates individually adjacent one end of said stack, means for transferring said mold plates one at a time from said landing means to that one of said supporting means adjacent said landing means, means for injecting plastic molding stock into each of said cavity plates as the same is transferred to said one supporting means, means for feeding a supply of said molding stock into said injecting means, control means for inhibiting actuation of said stock feeding means in response to presence of more than a predetermined minimum quantity of said molding stock in said injecting means, means interconnecting said transferring and injecting means with the other of said supporting means for releasing the latter from the second end of said stack upon operation of said transferring and injecting means, means for taking up the forces exerted on said stack by said transferring and injecting means and for removing said mold plates one at a time and in the same alternating sequence from said second end of said stack upon release therefrom of said other supporting means, means for displacing each of said mold plates individually from said removing means, means for ejecting the molded stock from said cavity plates and arranged to be actuated only in response to displacement of the latter from said removing means, and means for returning said mold plates in the same alternating sequence from said ejecting means to said landing means.

12. A molding machine according to claim 11, said injecting means comprising an injection cylinder and an injection plunger reciprocal therein, said control means comprising first means mounted for movement with said plunger and positioned to be entrained into such movement only after said plunger has been moved through a predetermined first portion of the injection stroke thereof, second means mounted for movement with said first means and positioned to be entrained into such movement only after said plunger and therewith said first means have been moved through a predetermined second portion of said injection stroke, third means mounted in the path of movement of said second means and engageable by the latter only upon continuation of said second portion of said injection stroke of said plunger to an extent sufficient to reduce the quantity of molding stock in said injection cylinder below said predetermined minimum, and fourth means responsive to engagement between said second and third means for actuating said stock feeding means so as to feed said supply of molding stock into said injection cylinder subsequent to completion of the idle, return stroke of said plunger.

13. A molding machine according to claim 12, said injection cylinder being provided with an inlet opening through which said supply of molding stock is fed by said feeding means and past which said plunger is moved during said first portion of said injection stroke thereof to sever the quantity of said molding stock within said injection cylinder from said supply of molding stock at said inlet opening, means responsive to movement of said first means a short interval after initiation of said second injection stroke portion for deactuating said stock feeding means, and means operable in response to deactuation of said stock feeding means for retracting said supply of molding stock a short distance from said inlet opening of said injection cylinder.

14. In an automatic molding machine; an injection unit comprising an injection cylinder provided at one end with injection orifice means and adjacent the other end with a lateral opening to define an entrance for raw molding stock, means for feeding said raw stock into said injection cylinder through said opening in the latter, a plunger extending into said injection cylinder from said other end thereof, power means for reciprocating said plunger within said cylinder and past said opening, said plunger being operable upon advancing movement toward said one end of said injection cylinder during an injection operation to sever the quantity of said raw stock fed thereinto from the remainder of said stock still disposed outside said injection cylinder at said opening, means for retracting said remainder of said raw stock from said opening upon deactuation of said feeding means prior to retraction of said plunger and subsequent to the severing action of the latter, and means responsive to said advancing movement of said plunger for controlling the operation of said feeding means so as to inhibit further action of said feeding means when subsequent to completion of an injection operation said quantity of raw stock still within said injection cylinder exceeds a predetermined minimum value.

15. In an automatic molding machine according to claim 14; said controlling means comprising a first catch member attached to and movable with said plunger, a pair of spaced crossbars connected to one another and mounted for reciprocal sliding movement along a path parallel to the path of movement of said plunger, a second catch member carried by one of said crossbars and projecting into the path of movement of said first catch member for engagement with the latter upon completion of an initial stage of said advancing movement of said plunger, a slidable platform, first stop means defining a rest position for said platform, a normally closed reset switch carried by said platform and provided with first and second operating elements adapted, respectively, to open and close said reset switch, a slidable reset member engageable with said second operating element of said reset switch, second stop means defining a rest position for said reset member intermediate said plunger and said first stop means and at a predetermined distance from the latter, a deflectable actuating member carried by the other of said crossbars and engageable with said first operating element of said reset switch and with said platform upon movement of said crossbars with said plunger subsequent to engagement between said first and second catch members, thereby to open said reset switch and entrain said platform with said reset switch into movement with said plunger, means positioned adjacent the path of movement of said actuating member for deflecting the same away from said first operating element subsequent to a predetermined initial portion of the movement of said platform under the influence of said actuating member, an additional switch mounted to be closed by said one crossbar shortly after the latter is entrained into movement by said plunger via said catch members, and electric circuit means controlled by said reset switch and said additional switch and operatively connected with said feeding means, whereby closing of said additional switch by said one crossbar deactuates said feeding means to permit retraction of said remainder of said stock from said opening, while opening of said reset switch due to engagement between said actuating member and said first operating element inhibits subsequent actuation of said feeding means until said plunger moves sufficiently far into said injection cylinder as to enable said actuating member to move said platform sufficiently to bring said second operating element of said reset switch into engagement with said reset member to reclose said reset switch.

16. In a molding machine according to claim 14; said stock feeding and retracting means comprising a platform carried by said injection cylinder, a plate slidably mounted on said platform for reciprocal movement toward and away from said injection cylinder and adapted to support a portion of said remainder of said raw molding stock, first and second stops on said platform for defining the limits of said movement of said plate toward and away from said injection cylinder, respectively, resilient means biasing said plate in the direction of said second stop, pneumatic motor means mounted on said platform and including a reciprocal piston rod provided with a head, a first pair of spring-biased jaws pivotally mounted on said head above said plate and on opposite sides of the path of movement of said portion of said remainder of raw stock and adapted to grip the same upon displacement of said piston rod with said head toward said injection cylinder due to actuation of said pneumatic motor means, a second pair of spring biased jaws pivotally mounted on said plate and facing in the same direction as said first pair of jaws, first abutment means carried by said plate for engagement by said head upon displacement of said piston rod toward said injection cylinder, to enable movement of said plate against said first stop, and second abutment means adjustably carried by said pneumatic motor means for engagement by said head upon displacement of said piston rod away from said injection cylinder due to deactuation of said pneumatic motor means.

17. In an automatic molding machine equipped with landing means for precisely positioning a plurality of mold plates individually prior to addition of each mold plate so positioned to the bottom of a stack of mold plates, and means for delivering such mold plates removed from the top of the stack one at a time to said landing means; said landing means comprising a pair of parallel, stationary rails spaced from one another a distance smaller than the overall width, and slightly larger than the width of a predetermined central portion, of each of said mold plates, guide rod means intersecting said rails adjacent one end thereof and engageable by each mold plate riding on said rails so as to define the terminal position of such mold plate relative to said stack, one of said rails being provided with a pair of recesses spaced from said guide rod means and from one another longitudinally of said one rail a distance greater than the length of each of said mold plates, and a catch arm pivotally mounted beneath said one rail and provided with a catch nose normally projecting through the recess nearest said guide rod means and with an actuator nose normally projecting through the recess farthest from said guide rod means, said delivering means comprising a first pair of downwardly inclined, parallel track means receiving said mold plates removed from the top of the stack and spaced from one another the same distance as said rails, a U-shaped transfer rocker mounted adjacent the discharge end of said first pair of track means for pivotal movement from a receiving position to a discharge position and having spaced side members provided with parallel slots adapted to be aligned with said first pair of track means, respectively, to receive a mold plate sliding therealong when said transfer rocker is in said receiving position, counterbalance means connected to said transfer rocker for retaining the same in and moving the same to said receiving position thereof when empty, latch means engagable with a portion of said transfer rocker for retaining the same in said receiving position when a mold plate is received in said side members, a second pair of track means slanting downwardly toward said rails from said discharge position of said transfer rocker in alignment with said rails, said second pair of track means terminating above said rails at a location intermediate said recesses in said one rail, a U-shaped pusher device having side elements slidably resting on said rails, respectively, and a cross element interconnecting said side elements at the ends thereof facing away from said guide rod means, fluid motor means including a reciprocal piston rod connected to said pusher device for displacing the same along said rails, and an actuator rod connected to and movable with said cross element of said pusher device and extending therefrom in a direction opposite to said side elements and toward said latch means for disengaging the same from said portion of said transfer rocker upon retraction of said piston rod, whereby cyclically upon receipt of a mold plate in said transfer rocker from said first pair of track means, retraction of said piston rod permits said transfer rocker to pivot to its discharge position under the weight of such mold plate so as to enable the latter to enter said second pair of track means and to slide therealong and onto said rails until arrested by said catch nose of said catch arm, said transfer rocker then returning to said receiving position thereof under the influence of said counterbalance means, while upon subsequent protraction of said piston rod one of said side elements of said pusher device first engages and depresses said actuator nose of said catch arm and therewith said catch nose, whereafter the free ends of said side elements contact the said mold plate and move the same toward said guide rod means.

References Cited in the file of this patent
UNITED STATES PATENTS
2,873,475    Linhorst _____ Feb. 17, 1959